United States Patent
Wang et al.

(10) Patent No.: US 12,041,582 B2
(45) Date of Patent: Jul. 16, 2024

(54) SIDELINK RESOURCE CONFIGURATION METHOD AND APPARATUS

(71) Applicant: HUAWEI TECHNOLOGIES CO., LTD., Guangdong (CN)

(72) Inventors: Ting Wang, Shanghai (CN); Hao Tang, Ottawa (CA); Xinxian Li, Shanghai (CN); Zhenfei Tang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 383 days.

(21) Appl. No.: 17/371,768

(22) Filed: Jul. 9, 2021

(65) Prior Publication Data
US 2021/0337515 A1 Oct. 28, 2021

Related U.S. Application Data

(63) Continuation of application No. PCT/CN2020/071530, filed on Jan. 10, 2020.

(30) Foreign Application Priority Data

Jan. 11, 2019 (CN) .......................... 201910027569.X

(51) Int. Cl.
*H04W 72/02* (2009.01)
*H04W 72/53* (2023.01)
*H04W 76/14* (2018.01)

(52) U.S. Cl.
CPC ........... *H04W 72/02* (2013.01); *H04W 72/53* (2023.01); *H04W 76/14* (2018.02)

(58) Field of Classification Search
CPC ............. H04W 72/02; H04W 72/0453; H04W 72/121; H04W 72/20; H04W 72/53; H04W 76/14
(Continued)

(56) References Cited

U.S. PATENT DOCUMENTS

| 10,237,849 B2* | 3/2019 | Liu .......................... H04W 4/06 |
| 2018/0227943 A1* | 8/2018 | xiao ....................... H04W 76/14 |

(Continued)

FOREIGN PATENT DOCUMENTS

| CN | 106559877 A | 4/2017 |
| CN | 107734590 A | 2/2018 |

(Continued)

OTHER PUBLICATIONS

MediaTek Inc., "Discussion on physical layer procedure, " 3GPP TSG RAN WG1 Meeting #95, R1-1812365, Spokane, USA, Nov. 12-16, 2018, 6 pages.
(Continued)

*Primary Examiner* — Robert J Lopata
(74) *Attorney, Agent, or Firm* — Fish & Richardson P.C.

(57) ABSTRACT

This application provides example sidelink resource configuration methods and apparatuses. One example method includes receiving, by a first terminal, first configuration information of a sidelink resource, where the sidelink resource configured by using the first configuration information includes a common resource in resource pools or sidelink bandwidth part BWP resources of N terminals in a terminal group, the terminal group includes the first terminal, and N is a positive integer. The first terminal can then perform sidelink communication with a terminal in the terminal group on the sidelink resource.

14 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0008030 A1* | 1/2020 | Kim ..................... | H04W 72/23 |
| 2020/0163005 A1* | 5/2020 | Rao ...................... | H04W 4/46 |
| 2021/0168766 A1* | 6/2021 | Su ....................... | H04W 72/0453 |
| 2021/0176747 A1* | 6/2021 | Yang .................... | H04W 72/0446 |
| 2021/0212023 A1* | 7/2021 | Zeng ..................... | H04W 72/121 |
| 2021/0258922 A1* | 8/2021 | Xiao ..................... | H04W 72/02 |
| 2021/0306824 A1* | 9/2021 | Li ........................ | H04W 4/40 |
| 2021/0314830 A1* | 10/2021 | Chang ................. | H04W 36/0009 |
| 2021/0377943 A1* | 12/2021 | Park .................... | H04W 72/0453 |
| 2022/0030602 A1* | 1/2022 | Yang ................... | H04W 72/1263 |
| 2022/0070972 A1* | 3/2022 | Belleschi .............. | H04W 4/08 |

FOREIGN PATENT DOCUMENTS

| | | |
|---|---|---|
| EP | 2928253 A1 | 10/2015 |
| EP | 3579633 A1 | 12/2019 |
| WO | 2018143786 A1 | 8/2018 |

OTHER PUBLICATIONS

PCT International Search Report and Written Opinion in International Application No. PCT/CN2020/071530, dated Apr. 7, 2020, 45 pages.

Extended European Search Report issued in European Application No. 20738040.3 on Feb. 10, 2022, 10 pages.

Fraunhofer HHI, Fraunhofer IIS, "Designs for NR V2X Mode 2 Resource Allocation," 3GPP TSG RAN WG1 Meeting #95, R1-1812399, Spokane, USA, Nov. 12-16, 2018, 10 pages.

* cited by examiner

SIDELINK RESOURCE CONFIGURATION METHOD AND APPARATUS

CROSS-REFERENCE TO RELATED APPLICATIONS

This application is a continuation of International Application No. PCT/CN2020/071530, filed on Jan. 10, 2020, which claims priority to Chinese Patent Application No. 201910027569.X, filed on Jan. 11, 2019. The disclosures of the aforementioned applications are hereby incorporated by reference in their entireties.

TECHNICAL FIELD

This application relates to the field of communications technologies, and in particular, to a sidelink resource configuration method and an apparatus.

BACKGROUND

Currently, a sidelink resource is introduced into application of communication between terminals, that is, the terminals may communicate with each other by using the sidelink resource. The communication between the terminals may also be referred to as sidelink communication.

In a new radio (NR) communications system, currently, no corresponding solution is provided for how to implement sidelink communication between terminals in a terminal group.

SUMMARY

This application provides a sidelink resource configuration method and an apparatus, to implement sidelink communication between terminals in a terminal group.

According to a first aspect, this application provides a sidelink resource configuration method, including: receiving, by a first terminal, first configuration information of a sidelink resource, where the sidelink resource configured by using the first configuration information includes a common resource in resource pools or sidelink bandwidth part BWP resources of N terminals in a terminal group, the terminal group includes the first terminal, and N is a positive integer; and performing, by the first terminal, sidelink communication with a terminal in the terminal group on the sidelink resource configured by using the first configuration information.

Based on the solution, the first terminal performs sidelink communication with a terminal in the terminal group on the common resource of the N terminals in the terminal group, thereby implementing communication between different terminals in the terminal group. Unicast and multicast sidelink communication can be implemented by notifying the common resource, so as to improve transmission performance. In addition, requirements of various services on a sidelink may be met, for example, transmission in different frame structure parameters is implemented.

In a possible implementation method, the N terminals are all terminals other than the first terminal in the terminal group, or the N terminals are all terminals in the terminal group.

In a possible implementation method, if the sidelink resource configured by using the first configuration information is the common resource in the resource pools of the N terminals in the terminal group, the common resource is a common resource in frequency domain.

In a possible implementation method, the first terminal receives second configuration information of the sidelink resource, and the first terminal determines a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

In a possible implementation method, the first terminal receives second configuration information of the sidelink resource, and the first terminal receives the second configuration information from an access network device.

In a possible implementation method, the first terminal sends third configuration information to a second terminal in the terminal group and/or a terminal other than the first terminal and the second terminal in the terminal group. The third configuration information is used by the second terminal and/or the terminal other than the first terminal and the second terminal in the terminal group to determine the resource pool and/or the sidelink BWP of the first terminal.

In a possible implementation method, the first terminal receives the second configuration information from a second terminal in the terminal group.

In a possible implementation method, the first terminal receives the second configuration information of the sidelink resource, and the first terminal sends fourth configuration information to an access network device and/or a terminal other than the first terminal and the second terminal in the terminal group. The fourth configuration information is used by the access network device and/or the terminal other than the first terminal in the terminal group to determine the resource pool and/or the sidelink BWP of the first terminal.

In a possible implementation method, the first terminal sends at least one piece of the following information to the second terminal in the terminal group and/or the terminal other than the first terminal and the second terminal in the terminal group: an identifier of the first terminal, a status of the first terminal, a capability of the first terminal, or radio frequency location information of the first terminal. The identifier of the first terminal includes at least one of a radio network temporary identifier, a layer 2 identifier, or a sidelink target identifier. The status of the first terminal includes at least one of in-coverage, out-of-coverage, a connected state, an idle state, or an inactive state. The capability of the first terminal includes at least one of a radio frequency bandwidth capability or a channel bandwidth capability.

In a possible implementation method, the second terminal is a terminal in the terminal group that is configured to manage the terminal group and/or assist in scheduling a terminal in the terminal group to perform sidelink communication.

According to a second aspect, this application provides a sidelink resource configuration method, including: determining, by a first device, first configuration information of a sidelink resource, where the sidelink resource configured by using the first configuration information includes a common resource in resource pools or sidelink bandwidth part BWP resources of N terminals in a terminal group, the terminal group includes a first terminal, and N is a positive integer; and sending, by the first device, the first configuration information of the sidelink resource to the first terminal, where the sidelink resource configured by using the first configuration information is used by the first terminal to perform sidelink communication with a terminal in the terminal group.

Based on the solution, the first device configures, for the first terminal, the common resource of the N terminals in the terminal group, so that the first terminal can perform sidelink communication with a terminal in the terminal group on the common resource, thereby implementing communication between different terminals in the terminal group. Unicast and multicast sidelink communication can be implemented by notifying the common resource, so as to improve transmission performance. In addition, requirements of various services on a sidelink may be met, for example, transmission in different frame structure parameters is implemented.

In a possible implementation method, the N terminals are all terminals other than the first terminal in the terminal group, or the N terminals are all terminals in the terminal group.

In a possible implementation method, if the sidelink resource configured by using the first configuration information is the common resource in the resource pools of the N terminals in the terminal group, the common resource is a common resource in frequency domain.

In a possible implementation method, the first device receives group information of the terminal group from a second device, and the first device determines the common resource based on the group information.

In a possible implementation method, the group information includes at least one piece of the following information: a terminal identifier of a terminal in the terminal group, a terminal status of a terminal in the terminal group, a group identifier of the terminal group, or the common resource.

In a possible implementation method, the first device is a second terminal in the terminal group, and the second device is an access network device; or the first device is an access network device, and the second device is a second terminal in the terminal group.

In a possible implementation method, the second terminal is a terminal in the terminal group that is configured to manage the terminal group and/or assist in scheduling a terminal in the terminal group to perform sidelink communication.

According to a third aspect, this application provides a sidelink resource configuration method, including: sending, by a second device, group information of a terminal group to a first device. The group information is used by the first device to determine a common resource in resource pools or sidelink bandwidth part BWP resources of N terminals in the terminal group, and N is a positive integer.

Based on the solution, the second device sends the group information of the terminal group to the first device, so that the first device can determine the common resource of the N terminals in the terminal group, and a terminal in the terminal group can perform sidelink communication on the common resource, thereby implementing communication between different terminals in the terminal group.

In a possible implementation method, the N terminals are all terminals in the terminal group or all terminals other than the first terminal in the terminal group, and the common resource is sent by the first device to the first terminal.

In a possible implementation method, if a sidelink resource configured by using first configuration information is the common resource in the resource pools of the N terminals in the terminal group, the common resource is a common resource in frequency domain.

In a possible implementation method, the group information includes at least one piece of the following information: a terminal identifier of a terminal in the terminal group, a terminal status of a terminal in the terminal group, a group identifier of the terminal group, or the common resource.

In a possible implementation method, the first device is a second terminal in the terminal group, the second device is an access network device, and the terminal group includes a header terminal; or the first device is an access network device, and the second device is a second terminal in the terminal group.

In a possible implementation method, the second terminal is a terminal in the terminal group that is configured to manage the terminal group and/or assist in scheduling a terminal in the terminal group to perform sidelink communication.

According to a fourth aspect, this application provides a sidelink resource configuration method, including: receiving, by a first terminal, first configuration information of a sidelink resource, where the sidelink resource configured by using the first configuration information includes a resource pool or a sidelink bandwidth part BWP resource of a second terminal; and performing, by the first terminal, sidelink communication with the second terminal on the sidelink resource configured by using the first configuration information.

Based on the solution, the first terminal may perform sidelink communication with the second terminal on the resource of the second terminal, thereby implementing communication between different terminals.

In a possible implementation method, if the sidelink resource configured by using the first configuration information is a common resource in resource pools of N terminals in a terminal group, the common resource is a common resource in frequency domain.

In a possible implementation method, the first terminal receives second configuration information of the sidelink resource, and the first terminal determines a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

According to a fifth aspect, this application provides an apparatus. The apparatus may be a terminal (such as a first terminal or a second terminal) or an access network device, or may be a chip. The apparatus has a function of implementing the sidelink resource configuration method in any one of the foregoing aspects or any implementation of any one of the foregoing aspects. The function may be implemented by hardware, or may be implemented by executing corresponding software by hardware. The hardware or the software includes one or more modules corresponding to the function.

According to a sixth aspect, an apparatus is provided, including a processor and a memory. The memory is configured to store computer execution instructions. When the apparatus runs, the processor executes the computer execution instructions stored in the memory, and the apparatus is enabled to perform the sidelink resource configuration method in any one of the foregoing aspects or any implementation of any one of the foregoing aspects.

According to a seventh aspect, this application further provides a computer-readable storage medium. The computer-readable storage medium stores instructions. When the instructions run on a computer, the computer is enabled to perform the sidelink resource configuration method in any one of the foregoing aspects or any implementation of any one of the foregoing aspects.

According to an eighth aspect, this application further provides a computer program product including instructions. When the computer program product runs on a computer, the computer is enabled to perform the sidelink resource configuration method in any one of the foregoing aspects or any implementation of any one of the foregoing aspects.

According to a ninth aspect, this application further provides a system. The system includes the first terminal in any one of the first aspect or the implementations of the first aspect, and the first device in any one of the second aspect or the implementations of the second aspect.

In a possible implementation method, the system further includes the second device in any one of the third aspect or the implementations of the third aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise stated, "a plurality of" means two or more than two. An architecture and a service scenario described in this application are intended to describe the technical solutions in this application more clearly, and do not constitute a limitation on the technical solutions provided in this application. With the evolution of the network architecture and the emergence of new service scenarios, the technical solutions provided in this application are also applicable to similar technical problems.

Figure 1:
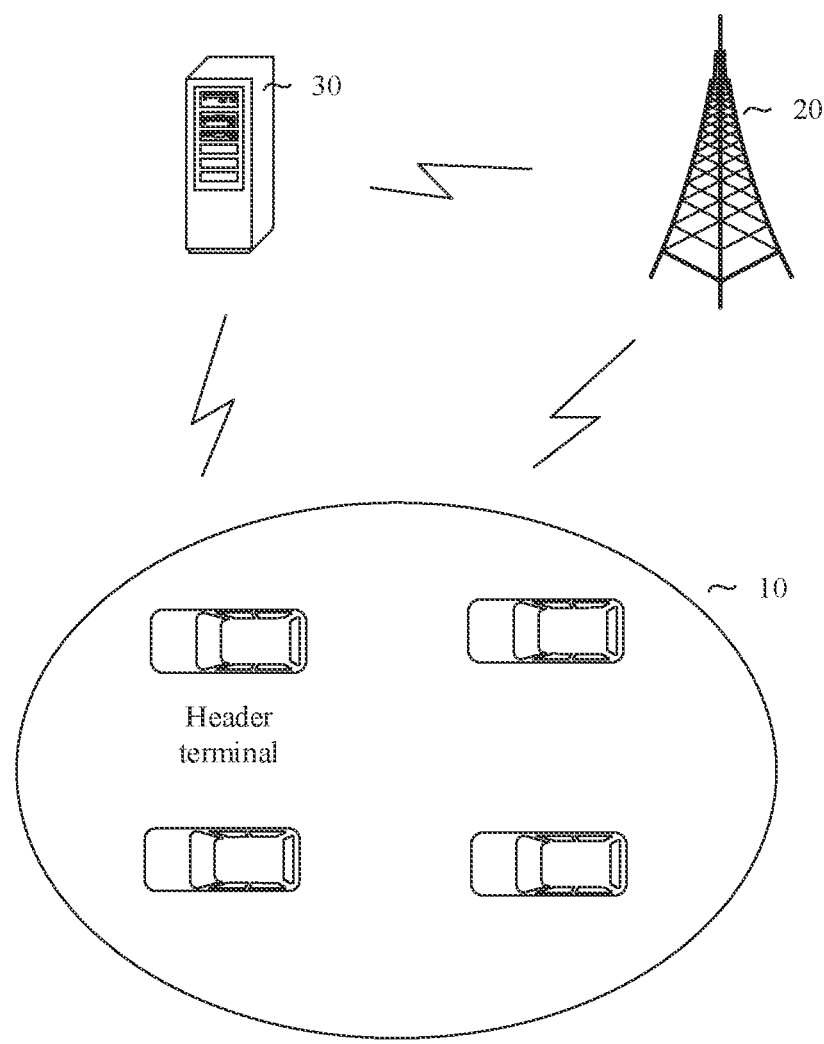
FIG. 1 is a schematic diagram of a possible network architecture according to this application.

FIG. 1 is a schematic diagram of a possible network architecture to which this application is applicable. The network architecture includes a terminal group 10 and an access network device 20. Optionally, the network architecture further includes a network management system 30. The terminal group 10 includes two or more terminals, and different terminals may communicate with each other. For example, one terminal sends control information and/or data to another terminal or a plurality of terminals, and the another terminal or the plurality of terminals may receive the control information and/or the data. Optionally, at least one header terminal (or referred to as a header device, header user equipment (UE), leader UE, or the like) may exist in the terminal group 10. In addition to having a communication function of a common terminal, the header terminal may further manage the terminal group and/or assist in scheduling a terminal in the terminal group to perform sidelink communication. The terminal communicates with the access network device 20 through a wired interface or a wireless interface. The terminal communicates with the network management system 30 through a wired interface or a wireless interface. For example, in an implementation, the terminal may communicate with the network management system 30 by using the access network device 20. In specific implementation, the network management system 30 may be a network management system of an operator.

In this application, any terminal other than the header terminal in the terminal group is referred to as a first terminal.

The header terminal in the terminal group in this application may also be referred to as a second terminal. For ease of description, each second terminal is subsequently referred to as the header terminal, that is, each header terminal appearing subsequently may be replaced with the second terminal. A unified explanation is provided herein, and details are not described subsequently.

The terminal is a device having a wireless sending and receiving function. The terminal may be deployed on land, and include an indoor device, an outdoor device, a hand-held device, or a vehicle-mounted device; or may be deployed on the water (for example, on a ship); or may be deployed in the air (for example, on a plane, a balloon, or a satellite). The terminal may be a mobile phone, a tablet computer (pad), a computer with a wireless sending and receiving function, a virtual reality (VR) terminal, an augmented reality (AR) terminal, a wireless terminal in industrial control, a wireless terminal in self-driving (self-driving), a wireless terminal in remote medical, a wireless terminal in a smart grid, a wireless terminal in transportation safety, a wireless terminal in a smart city or a wireless terminal in a smart home, and may further include user equipment (UE) or the like. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G (5G) network, a terminal device in a future evolved public land mobile communications network (PLMN), or the like. The terminal sometimes may also be referred to as a terminal device, UE, an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communications device, a UE agent, a UE apparatus, or the like. The terminal may be fixed or mobile. This is not limited in the embodiments of this application.

The access network device may also be referred to as a radio access network RAN) device, and is a device that provides a wireless communications function for a terminal. For example, the access network device includes but is not limited to a next-generation NodeB (gNB) in 5G, an evolved NodeB (eNB), a radio network controller (RNC), a NodeB (NB), a base station controller (BSC), a base transceiver station (BTS), a home base station (for example, a home evolved nodeB, or a home node B, HNB), a baseband unit (BBU), a transmission and reception point (TRP), a transmission point (TP), a mobile switching center, or the like. The access network device may alternatively be a radio controller, a centralized unit (CU), and/or a distributed unit (DU) in a cloud radio access network (CRAN) scenario; or the network device may be a relay station, an access point, a vehicle-mounted device, a terminal device, a wearable device, a network device in a future 5G network, a network device in a future evolved PLMN network, or the like. The terminal may communicate with a plurality of access network devices of different technologies. For example, the terminal may communicate with an access network device supporting a Long Term Evolution (LTE) network, or may communicate with an access network device supporting a 5G network, or may support dual connectivity to an access network device in an LTE network and an access network device in a 5G network. This is not limited in the embodiments of this application.

This application is applicable to both a homogeneous network scenario and a heterogeneous network scenario, and a transmission point is not limited. This application may be applied to coordinated multipoint transmission between macro base stations, between micro base stations, and between a macro base station and a micro base station. This application is applicable to both a low-frequency scenario (sub 6 G) and a high-frequency scenario (above 6 G).

The access network device and the terminal may transmit data to each other by using an air interface resource. The air interface resource may include a time domain resource and a frequency domain resource. The time domain resource and the frequency domain resource may also be referred to as a time-frequency resource. The frequency domain resource may fall within a frequency range. The frequency range may also be referred to as a frequency band. A width of the frequency domain resource may be referred to as a bandwidth (BW) of the frequency domain resource. It should be noted that the word "transmission" in this application may include sending and/or receiving of information, for example, sending and/or receiving of data and/or control information.

Some communication words or terms used in this application are described below, and the communication words or terms also form a part of the present invention in this application.

I. Sidelink (Sidelink)

A sidelink is used for communication between terminals, and may include a physical sidelink shared channel (PSSCH) and a physical sidelink control channel (PSCCH). The PSSCH may be used to transmit data, and the PSCCH may be used to transmit control information (for example, scheduling assignment (SA) information).

Optionally, the sidelink may also be referred to as a sidelink.

Optionally, sidelink communication may further include a physical sidelink uplink control channel (PSUCCH). The physical sidelink uplink control channel may also be referred to as a sidelink uplink control channel for short. The physical sidelink uplink control channel may also be referred to as a physical sidelink feedback channel (PSFCH). The physical sidelink feedback channel may also be referred to as a sidelink feedback channel for short. The sidelink uplink control channel or the sidelink feedback channel may be used to transmit sidelink feedback control information (SFCI). The sidelink feedback control information may also be referred to as sidelink feedback information for short, or may also be referred to as sidelink uplink control information (SL UCI). The sidelink uplink control channel may be used to transmit at least one piece of information in channel state information (CSI), hybrid automatic repeat request (HARQ) information, or the like. The HARQ information may include acknowledgement (ACK) information or a negative acknowledgement (NACK).

II. BWP

In a wireless communications system, a bandwidth part may be a segment of consecutive frequency domain resources. The bandwidth part may also be referred to as a carrier bandwidth part (carrier BWP). Configuration of the carrier BWP may include a frequency start resource block (RB), a bandwidth (BW), a corresponding frame structure parameter (numerology), and the like of the carrier bandwidth part. The bandwidth may be a quantity of RBs included in the carrier bandwidth part. There is a limitation on a maximum quantity of BWPs that can be configured for a terminal. For example, a maximum of four BWPs can be configured for the terminal in one serving cell. There is also a limitation on a quantity of BWPs that can be simultaneously activated for the terminal. For example, the quantity of BWPs that can be simultaneously activated for the terminal is 1. The terminal transmits and receives data on an activated BWP.

Optionally, a BWP resource may include a sidelink BWP resource and a BWP resource of a Uu air interface (the Uu air interface may be understood as a universal UE to network interface). The sidelink BWP resource is used for communication between terminals, and the BWP resource of the Uu air interface is used for communication between a terminal and an access network device. The BWP of the Uu air interface herein may also be referred to as a Uu BWP for short.

A frame structure parameter (numerology) may include a subcarrier spacing and/or a cyclic prefix (CP) type, and the like. The CP type may also be referred to as a CP length, or referred to as a CP for short. The CP type may be an extended CP or a normal CP. A next slot of the extended CP may include 12 time domain symbols, and a next slot of the normal CP may include 14 time domain symbols. The time domain symbol may be referred to as a symbol for short. The time domain symbol may be an orthogonal frequency division multiplexing (OFDM) symbol, or may be a discrete fourier transform spread orthogonal frequency division multiplexing (DFT-s-OFDM) symbol. In the embodiments of this application, an example in which the time domain symbol is the OFDM symbol may be used for description.

As shown in Table 1, five frame structure parameters may be supported in an NR system, which are respectively numbered 0 to 4. A frame structure parameter corresponding to the number 0 is as follows: The subcarrier spacing is 15 kHz, and the CP is a normal CP. A frame structure parameter corresponding to the number 1 is as follows: The subcarrier spacing is 30 kHz. and the CP is a normal CP. A frame structure parameter numbered 2 is as follows: The subcarrier spacing is 60 kHz, and the CP is a normal CP or an extended CP. A frame structure parameter numbered 3 is as follows: The subcarrier spacing is 120 kHz, and the CP is a normal CP. A frame structure parameter numbered 4 is as follows: The subcarrier spacing is 240 kHz, and the CP is a normal CP.

TABLE 1

Supported frame structure parameters numerologies)

| $\mu$ | $\Delta f = 2^\mu \cdot 15 [kHz]$ | Cyclic prefix (cyclic prefix, CP) |
|---|---|---|
| 0 | 15 | Normal |
| 1 | 30 | Normal |
| 2 | 60 | Normal, extended |
| 3 | 120 | Normal |
| 4 | 240 | Normal |

There may be different slot lengths for different subcarrier spacing. For example, when the subcarrier spacing is 15 kHz, a slot may be 1 millisecond (ms). When the subcarrier spacing is 30 kHz, a slot may be 0.5 ms. A slot may include one or more symbols. For example, a next slot of the normal CP may include 14 symbols, and a next slot of the extended CP may include 12 symbols. A mini-slot, also referred to as a mini-slot, may be a unit smaller than a slot, and a mini-slot may include one or more symbols. For example, a mini-slot may include two symbols, four symbols, seven symbols, or the like. A slot may include one or more mini-slots.

The subcarrier spacing of 15 kHz is used as an example. A radio frame may last 10 ms, each subframe may last 1 ms, and a radio frame includes 10 subframes. Each slot lasts 1 ms, each subframe may include a slot, and each slot may include 14 symbols. Further, a mini-slot may include four symbols, two symbols, seven symbols, or the like.

Slot features of different frame structure parameters are shown in Table 2. $N_{symb}^{slot}$ represents a quantity of symbols included in a slot, and numbers (or referred to as indexes) of the symbols in the slot are 0 to $N_{symb}^{slot}-1$. For example, 14 symbols may be in the normal CP, and 12 symbols may be in the extended CP. A radio frame may be 10 ms, a radio frame may include 10 subframes, and a subframe is 1 ms. $N_{slot}^{frame, \mu}$ represents a quantity of slots included in a radio frame in the frame structure parameter $\mu$, and numbers (or referred to as indexes) $n_s^{\mu}$ of the slots in the radio frame are 0 to $N_{slot}^{frame, \mu}-1$. $N_{slot}^{subframe, \mu}$ represents a quantity of slots included in a subframe in the frame structure parameter $\mu$, and numbers of the slots in the subframe are $n_{s,f}^{\mu} \in \{0, \ldots, N_{slot}^{frame, \mu}-1\}$, that is, 0 to $N_{slot}^{subframe, \mu}-1$.

TABLE 2

Slot features of a frame structure parameter in a normal CP

| $\mu$ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 70 | 7 |
| 2 | 14 | 40 | 4 |
| 3 | 14 | 80 | 8 |
| 4 | 14 | 160 | 16 |

III. Sidelink Resource

A sidelink resource is a resource used for communication between terminals. The sidelink resource may include a frequency-domain sidelink resource and a time-domain sidelink resource. This application mainly discusses the frequency-domain sidelink resource. Each sidelink resource appearing subsequently may refer to the frequency-domain sidelink resource, and a unified explanation is provided herein.

From a perspective of a transmission type, the sidelink resource may include a sidelink sending resource and a sidelink receiving resource. The sidelink sending resource is used to send information, for example, send control information and/or data. The sidelink receiving resource is used to receive information, for example, receive control information and/or data.

Optionally, a sidelink signal may include control information and/or data and/or feedback information carried on a sidelink channel.

Optionally, the control information may be information used to schedule data, for example, downlink control information (DCI) or sidelink control information (SCI) in the prior art. The feedback information may be fed information, for example, uplink control information (UCI) or sidelink feedback information (SFCI) in the prior art. The control information may be carried by using a control channel, for example, a PSCCH or a physical sidelink control channel. The feedback information may be carried by using a feedback channel, for example, a PSFCH, a physical sidelink feedback channel, or a physical sidelink uplink control channel (PSUCCH).

Optionally, the data may be a signal in a broad sense, or may be a data packet, or may be a transport block or a codeword. The data may be carried by using a data channel, for example, a PSSCH or a physical sidelink shared channel.

From a perspective of resource assignment type, the sidelink resource may include a sidelink BWP resource and/or a sidelink resource pool. Optionally, a sidelink resource pool may be some or all resources in a sidelink BWP resource.

Optionally, a relationship between a resource pool and a sidelink BWP resource may be that one resource pool is associated with one BWP resource.

Optionally, a frequency domain resource in a resource pool may be located in a frequency domain resource of a sidelink BWP, and a frequency domain resource in one resource pool does not cross frequency domain resources of two sidelink BWPs.

Optionally, a sidelink BWP resource may include one or more sidelink resource pools.

Optionally, if the two resource classification manners are combined, the sidelink BWP resource may include a sidelink transmission BWP resource and a sidelink receiving BWP resource. The sidelink resource pool may include a sidelink sending resource pool and a sidelink receiving resource pool.

Optionally, the sidelink transmission BWP resource and the sidelink receiving BWP resource may be collectively referred to as the sidelink BWP resource.

Optionally, the sidelink resource pool may include two parts of resources. One part is a scheduling assignment (SA) resource, and the resource is used to transmit scheduling information. The other part is a data resource, and the resource is used to transmit data. Therefore, the sidelink sending resource pool may include a scheduling assignment resource and a data resource, and the sidelink receiving resource pool may also include a scheduling assignment resource and a data resource.

Optionally, the sidelink BWP resource may include a sidelink sending resource pool and/or a sidelink receiving resource pool.

Optionally, the sidelink transmission BWP resource may include a sidelink sending resource pool.

Optionally, the sidelink receiving BWP resource may include a sidelink receiving resource pool.

IV. Manner for Configuring a Sidelink Resource for a Terminal

Manner 1: Preconfiguration

For example, an operator preconfigures a sidelink resource for a terminal, or preconfigures a sidelink resource for a terminal in a predefined manner in a standard protocol.

The sidelink resource may be configured for one or more terminals through preconfiguration. In specific implementation, a network management system of the operator may send preconfiguration information to each terminal. The preconfiguration information is used to configure the sidelink resource for each terminal. Because the preconfiguration information is sent to a plurality of terminals, the sidelink resource configured by using the preconfiguration information may be used for broadcast transmission between the terminals. For example, a terminal 1 may broadcast data and/or control information by using the sidelink resource configured by using the preconfiguration information, and another terminal, such as a terminal 2, may receive the data and/or the control information on the sidelink resource. Certainly, in actual application, the sidelink resource configured by using the preconfiguration information may be further used for multicast transmission and/or unicast transmission. This is not limited in this application.

Optionally, in this application, broadcast transmission may be referred to as broadcast sidelink signal communication, or may be referred to as sidelink communication of a broadcast service, or sidelink communication of a broadcast transmission type.

Optionally, in this application, multicast transmission may be referred to as multicast sidelink signal communication, or may be referred to as sidelink communication of a multicast service, or sidelink communication of a multicast transmission type.

Optionally, in this application, unicast communication may be referred to as unicast sidelink signal communication, or may be referred to as sidelink communication of a unicast service, or sidelink communication of a unicast transmission type.

Specifically, the network management system operated by the operator may configure a sidelink BWP for the terminal device by using preconfigured signaling, and the sidelink BWP may be referred to as a preconfigured sidelink BWP. A common BWP may include the preconfigured sidelink BWP. Optionally, the preconfigured sidelink BWP may also be referred to as a preconfigured BWP for short.

For example, the network management system may write the preconfigured signaling into a SIM or USIM of the terminal. The terminal may obtain configuration information of the preconfigured sidelink BWP by reading the preconfigured signaling in the SIM card, and further determine the preconfigured sidelink BWP. Alternatively, the network management system may send the preconfigured signaling to mobile equipment (ME) of the terminal. The terminal may determine the preconfigured sidelink BWP by using the preconfigured signaling.

Optionally, a sending resource pool and/or a receiving resource pool configured in the preconfigured BWP may be referred to as a preconfigured resource pool. The preconfigured resource pool may include a preconfigured sending resource pool and/or a preconfigured receiving resource pool.

The SIM (subscriber identification module) may be a subscriber identity module card, and may also be referred to as a subscriber identification card, a smart card, or the like. The USIM may be an abbreviation for a universal subscriber identity module, and may also be referred to an upgrade SIM.

Optionally, the one or more terminals may be terminals served by the operator.

Optionally, the one or more terminals may be one or more terminals that can receive the preconfiguration information of the operator, for example, all terminals served by a cell.

Manner 2: System Information Configuration or Radio Resource Control (RRC) Common Information Configuration For example, an access network device sends system information or RRC common information to a terminal. The system information or the common RRC information may be a cell-level parameter.

A sidelink resource may be configured for a group of terminals through system information configuration or RRC common information configuration. In specific implementation, the access network device may send the system information or the RRC common information to a group of terminals. The system information or the RRC common information is used to configure a sidelink resource for each terminal. Because the system information or the RRC common information is sent to a group of terminals, a sidelink resource configured by using the system information or the RRC common information may be used for multicast transmission between terminals in the group. For example, a terminal 1 may multicast data and/or control information by using the sidelink resource configured by using the system information or configured by using the RRC common information, and another terminal in the group, such as a terminal 2, may receive the data or the control information on the sidelink resource.

Specifically, for example, the access network device may configure a sidelink BWP for the terminal by using the system information or the RRC common information, and the sidelink BWP may be referred to as a system common sidelink BWP. Optionally, the system common sidelink BWP may also be referred to as a system common BWP or a common BWP for short.

Optionally, a sending resource pool and/or a receiving resource pool configured in the system common BWP may be referred to as a system common resource pool or a common resource pool. The common resource pool may include a common sending resource pool and/or a common receiving resource pool.

Optionally, the group of terminals may include one or more terminals.

Optionally, the group of terminals may be one or more terminals that can receive the system information or the RRC common information. For example, terminals served by a cell may be divided into a plurality of groups, and the group of terminals is one of the groups.

Certainly, in actual application, the sidelink resource configured by using the system information or configured by using the RRC common information may be further used for unicast transmission and/or broadcast transmission. This is not limited in this application.

Manner 3: RRC Dedicated Information Configuration

For example, an access network device sends RRC dedicated information to a terminal. The RRC dedicated information may be a terminal-level parameter (or referred to as a UE-level parameter), and a parameter is configured for the terminal.

In the RRC dedicated information configuration manner, a sidelink resource may be configured for a single terminal. In specific implementation, the access network device may send the RRC dedicated information to a single terminal, and the RRC dedicated information is used to configure a sidelink resource for the terminal. Because the RRC dedicated information is sent to a single terminal, the sidelink resource configured by using the RRC dedicated information may be used for unicast transmission between terminals in a group. For example, a terminal 1 may send data or control information to a terminal 2 in a unicast mode by using the sidelink resource configured by using the RRC dedicated information.

Specifically, for example, the access network device may configure a sidelink BWP for the terminal by using the RRC dedicated information. The sidelink BWP may be referred to as a user-dedicated sidelink BWP, or referred to as a user-specific sidelink BWP, or referred to as a user-dedicated BWP for short, or referred to as a user-specific BWP for short, or referred to as a dedicated BWP for short, or referred to as a specific BWP for short. The BWP may be configured by the network device for the terminal by using UE-specific signaling.

Optionally, a sending resource pool and/or a receiving resource pool configured in the dedicated BWP may be referred to as a dedicated resource pool. The dedicated resource pool may include a dedicated sending resource pool and/or a dedicated receiving resource pool.

Certainly, in actual application, the sidelink resource configured by using the RRC dedicated information may be further used for broadcast transmission and/or multicast transmission. This is not limited in this application.

V. Base Station Scheduling Mode of a Sidelink (SL)

In the base station scheduling mode, a network device may configure an SL resource for transmit-end UE (also referred to as a sending terminal) and/or an SL resource for receive-end UE (also referred to as a receiving terminal) by using configuration information. The SL resource includes one or more resource pools. In the embodiments of this application, "a plurality of" may be two, three, four, or more. This is not limited in the embodiments of this application. The network device may indicate, to the transmit-end UE by using DCI, a resource that is in the resource pool and that is used for sidelink communication. When receiving the DCI, the transmit-end UE may send SL information to the receive-end UE by using the resource that is in the resource pool and that is indicated by the DCI. The SL information may include SL data and/or SCI and/or SFCI, or the like. Correspondingly, the receive end may receive the SL information. The network device may be a base station, a network management system operated by an operator, or the like.

Figure 2A:
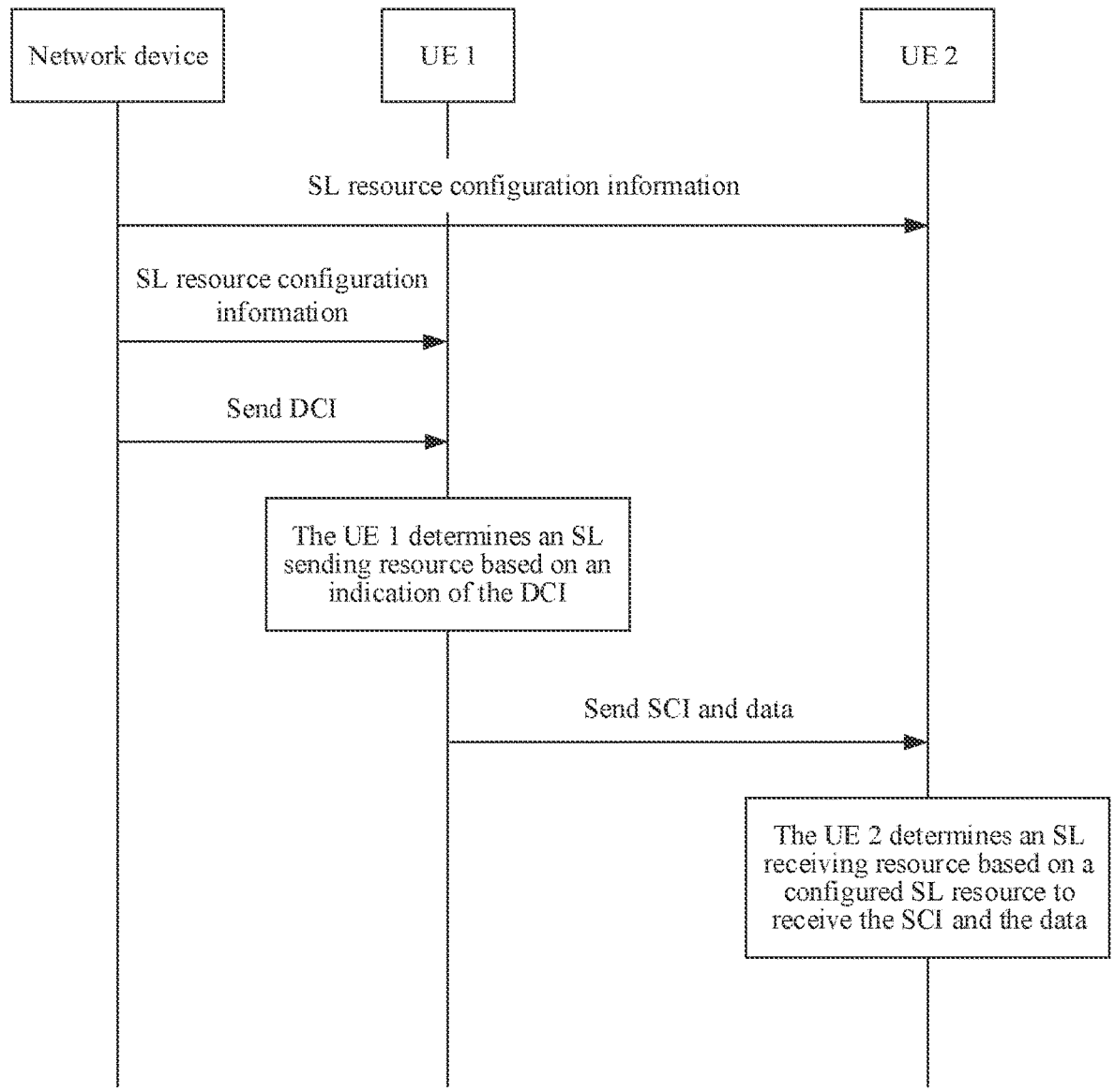
FIG. 2(a) is a base station scheduling mode of an SL according to this application

The base station scheduling mode of an SL is described below with reference to FIG. 2(a) by using an example in which a terminal is UE. As shown in FIG. 2(a), the network device may configure SL resources for UE 1 and UE 2. The network device may send the DCI to the UE 1. The UE 1 may determine an SL sending resource based on an indication of the DCI, and send SCI and/or SL data on the SL sending resource. The UE 2 determines an SL receiving resource based on the configured SL resource, receives the SCI on the SL receiving resource, and receives the SL data on the receiving resource based on the SCI. Optionally, the UE 2 may send SFCI to the UE 1 after receiving the SL data. For example, if the UE 2 correctly receives the SL data, the SFCI may include a positive acknowledgement (ACK); or if the UE 2 incorrectly receives the SL data, the SFCI may include a negative acknowledgement (NACK), and so on.

In an example, the network device may configure SL resources for UE 1, UE 2, and UE 3, and the network device may assign SL sending resources to the UE 3 and the UE 1 by using the DCI. The UE 3 may send an SL signal to the UE 1 on the SL sending resource. For example, the SL signal may include SCI and/or SL data, or the like. The UE 1 may send SFCI to the UE 3 after the UE 1 receives the SL signal. Optionally, in addition, the UE 1 may send an SL signal to the UE 2 on the SL sending resource. For example, the SL signal may include SCI and/or SL data, or the like. The UE 2 may send SFCI to the UE 1 after the UE 2 receives the SL signal.

Optionally, the base station scheduling mode may also be referred to as a base station-assisted scheduling mode.

VI. UE Autonomous Selection Mode of a Sidelink SL

In the UE autonomous selection mode, a network device may configure an SL resource for a transmit-end UE and/or an SL resource for a receive-end UE by using configuration information. The SL resource includes one or more resource pools. The transmit-end UE performs perception on the configured SL resource. If the transmit-end UE perceives that there is an available resource in the SL resource, the transmit-end UE sends SL information on the available resource. Correspondingly, the receive-end UE receives the SL information on the SL resource.

Figure 2B:
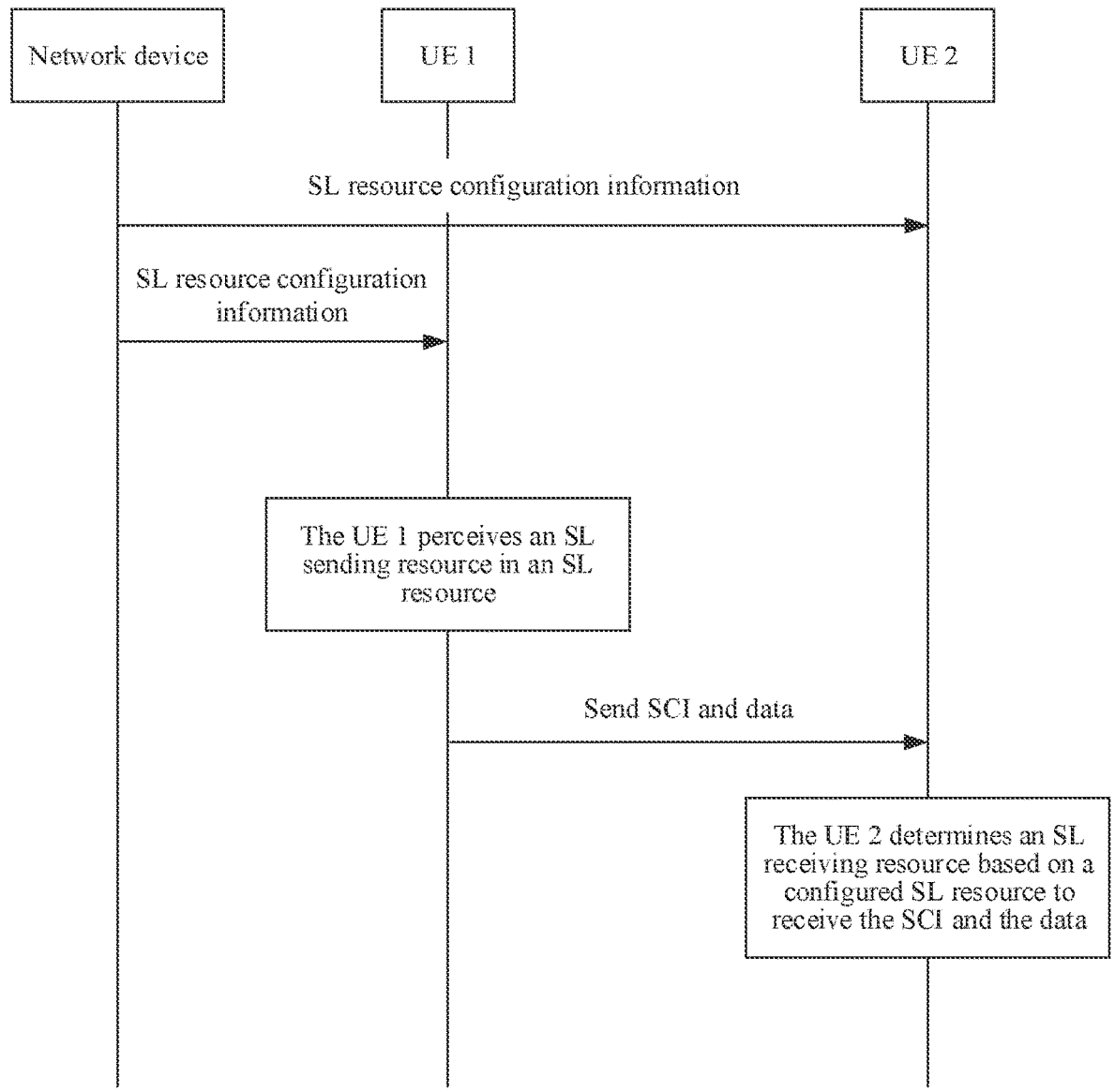
FIG. 2(b) is a UE autonomous selection mode of an SL according to this application.

The UE autonomous selection mode of an SL is described below with reference to FIG. 2(b) by using an example in which a terminal is UE. As shown in FIG. 2(b), the network device may configure SL resources for UE 1 and UE 2. The UE 1 perceives an SL sending resource in the configured SL resource, and sends SCI and/or SL data on the SL sending resource. Correspondingly, the UE 2 receives the SCI and/or the SL data based on the configured SL resource. Optionally, after receiving the SL data, the UE 2 may perceive an SL sending resource in the configured SL resource, and send SFCI or the like to the UE 1 on the SL sending resource.

Similar to the base station scheduling mode of a sidelink SL, when the UE 1 serves as a transmit end and sends SL data information to the UE 2 on the SL sending resource, the UE 1 may also serve as a receive end to receive SL data information sent by UE 3. Optionally, in addition, the UE 1 may send SFCI to the UE 3 on the SL sending resource. For detailed description, refer to the foregoing description of the base station scheduling mode of a sidelink SL. Details are not described herein again.

It should be noted that the word "transmission" in this application may include sending and/or receiving of data and/or control information. Words such as "first" and "second" are merely used for distinction and description, and shall not be understood as an indication or an implication of relative importance or an indication or an implication of an order.

It should be noted that a first device in this application refers to an access network device, and a second device refers to a header terminal; or the first device refers to a header terminal, and the second device refers to an access network device.

Figure 2C:
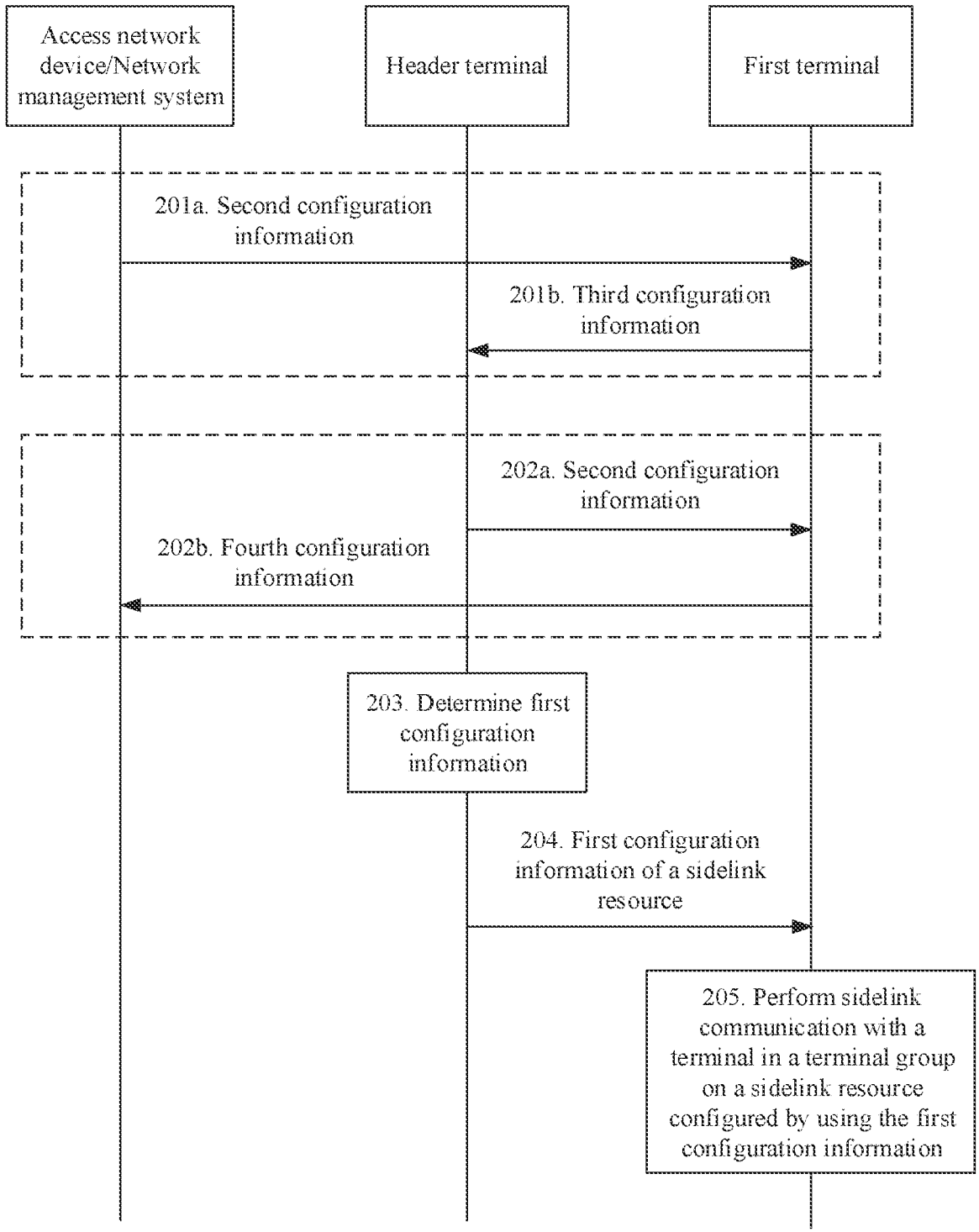
FIG. 2(c) is a flowchart of a sidelink resource configuration method according to this application.

Based on the network architecture shown in FIG. 1, this application provides a sidelink resource configuration method. As shown in FIG. 2(c), the method includes the following steps.

Step 203: A header terminal determines first configuration information of a sidelink resource.

Step 204. The header terminal sends the first configuration information of the sidelink resource to a first terminal, where the sidelink resource configured by using the first configuration information includes a common resource in resource pools or sidelink BWP resources of N terminals in a terminal group, the terminal group includes the first terminal, and N is a positive integer.

In an implementation, if the sidelink resource configured by using the first configuration information is the common resource in the resource pools of the N terminals in the terminal group, the common resource herein may be a common resource in frequency domain.

Optionally, the common resource may be a common receiving resource and/or a common sending resource.

In an implementation, the N terminals herein are all terminals other than the first terminal in the terminal group. For example, the terminal group includes 20 terminals respectively numbered 1 to 20. If the first terminal is the terminal 1, the N terminals herein refer to the terminal 2 to the terminal 20. The terminal 1 to the terminal 20 may include the header terminal. Based on the implementation, the header terminal sends a common resource in resource pools or sidelink BWP resources of the 19 terminals to the terminal 1, that is, the common resource herein is a resource included in all the 19 terminals.

In another implementation, the N terminals herein are all terminals in the terminal group. For example, the terminal group includes 20 terminals respectively numbered 1 to 20. If the first terminal is the terminal 1, the N terminals herein refer to the terminal 1 to the terminal 20. The terminal 1 to the terminal 20 may include the header terminal. Based on the implementation, the header terminal sends a common resource in resource pools or sidelink BWP resources of the 20 terminals to the terminal 1, that is, the common resource herein is a resource included in all the 20 terminals.

Optionally, the header terminal may send the first configuration information to the first terminal through a PC5 air interface. The PC5 air interface may be an air interface used for communication between terminals, for example, may be physical layer communication or higher layer communication.

Optionally, when the first configuration information indicates the common resource, the common resource may be determined by indicating a resource pool.

Optionally, when the first configuration information indicates the common resource, the common resource may be determined by indicating location information or resource information of the common resource.

For example, the header terminal may indicate, by using the first configuration information, an identifier of the resource pool included in the common resource, for example, a resource pool 0 or a resource pool 1. For another example, the header terminal may indicate the location information of the common resource by using the first configuration information. The location information is used to determine a frequency domain resource included in the common resource. For example, an indication method similar to that for indicating a BWP may be used. For example, a location (for example, a start location+bandwidth) of the frequency domain resource of the common resource is indicated.

Optionally, in this application, when indicating the identifier of the resource pool, the first configuration information may indicate a bitmap of the resource pool. For example, if there are R resource pools, R bits may be used to indicate the R resource pools, and one bit may correspond to one resource pool. For example, if a bit value is 1, it indicates that a resource pool corresponding to the bit is a common resource; or if a bit value is 0, it indicates that the resource pool corresponding to the bit is not a common resource. Alternatively, the bit may have an opposite meaning. This is not specifically limited in this application.

Optionally, in this application, when the first configuration information indicates the identifier of the resource pool, bit binary coding may be used. For example, if there are R resource pools, $\log_2(R)$ bits may be used to indicate the R resource pools, and one binary bit value may correspond to one resource pool. For example, the first configuration information may indicate a number of a resource pool in a carrier. For example, if the carrier includes eight resource pools, where numbers of the resource pools may be 0 to 7 or 1 to 8, the common resource may be indicated by using 3 bits. If a bit value is 000, it indicates that a first resource pool (a resource pool numbered 0 or 1) is the common resource; or if a bit value is 001, it indicates that a second resource pool (a resource pool numbered 1 or 2) is the common resource, and so on. For example, the first configuration information may indicate a number of a resource pool in a bandwidth path (BWP). For example, if a BWP of the terminal includes four resource pools, where numbers of the resource pools may be 0 to 3 or 1 to 4, the common resource may be indicated by using 2 bits. If a bit value is 00, it indicates that a first resource pool (a resource pool numbered 0 or 1) is the common resource; or if a bit value is 01, it indicates that a second resource pool (a resource pool numbered 1 or 2) is the common resource, and so on. Alternatively, a bit meaning may be determined based on a correspondence between a bit meaning and a resource pool. The correspondence may be predefined in a protocol, or notified to the terminal by using signaling. This is not specifically limited in this application.

Optionally, in this application, when indicating the common resource, the first configuration information may indicate a start location and a bandwidth that correspond to the common resource. The start location may be a start RB, and the bandwidth may be a quantity or a length of RBs. Specifically, for example, a resource indication value (RIV) may be used to indicate the start RB location and the length of the RB of the common resource. For example, the start RB and the length of the RB may be determined based on the RIV according to the following formula.

If $(L_{RBs}-1) \leq \lfloor N_{BWP}^{size}/2 \rfloor$, $RIV = N_{BWP}^{size}(L_{RBs}-1) + RB_{start}$.

Otherwise, $RIV = N_{BWP}^{size}(N_{BWP}^{size}-L_{RBs}+1) + (N_{BWP}^{size}-1-RB_{start})$.

$RB_{start}$ is the start RB of the common resource. $L_{RBs}$ is the length of the RB of the common resource, and $L_{RBs}$ is greater than or equal to 1 and not greater than $N_{BWP}^{size}-RB_{start}$. $N_{BWP}^{size}$ is an indicated maximum bandwidth, for example, may be a maximum bandwidth of the common resource, or may be a maximum bandwidth of a BWP, for example, may be 275 RBs or 273 RBs. To be specific, starting from $RB_{start}$, $L_{RBs}$ RBs with consecutive indexes are the common resource indicated by the first configuration information.

After receiving the RIV, the terminal may determine the start RB and the length of the RB based on a correspondence between the RIV and each of the start RB and the length of the RB, or may determine the common resource indicated by the first configuration information to the terminal. The terminal may perform, starting from the start RB, sidelink signal transmission with another terminal on the common resource whose RBs have consecutive indexes and whose length is the length of the RB.

Optionally, in this application, when indicating the common resource, the first configuration information may indicate a start location corresponding to the common resource. A bandwidth of the common resource may be predefined in a protocol. For example, the bandwidth is a quantity of RBs included in a resource pool, for example, may be 20 RBs, 50 RBs, or the like.

Optionally, in this application, when indicating the common resource, the first configuration information may indicate a bandwidth corresponding to the common resource. A start location of the common resource may be predefined in a protocol. For example, the bandwidth corresponding to the common resource is located at a center of the carrier bandwidth. Specifically, for example, a central location of the common resource is a central location or a central frequency of the carrier bandwidth.

Optionally, the first configuration information may also indicate a frame structure parameter corresponding to the common resource.

Optionally, when the common resource is indicated, a carrier bandwidth in the frame structure parameter corresponding to the common resource may be indicated.

Optionally, the start location may be an offset relative to a common RB number, or may be an offset relative to a first RB of the BWP of the terminal, or may be an offset relative to a lowest RB number of the BWP of the terminal.

Optionally, the RB may be a frequency domain unit granularity. For example, an RB may include 12 subcarriers. Optionally, the RB may be replaced with another frequency domain unit granularity. This is not specifically limited in this application.

Specifically, the common RB number may represent an index of an RB in a carrier, that is, the common RB number is designed by using the carrier as a reference object. Optionally, the carrier may be a carrier at a frame structure parameter level or a carrier at a subcarrier spacing level. Different subcarrier spacing may correspond to different carriers. Specifically, RBs are numbered starting from a start RB of the carrier in a frequency increase or decrease direction, so that any RB in the carrier is an RB that is offset by S1 RBs relative to the start RB of the carrier. S1 is an integer greater than or equal to 0.

Optionally, in this application, the number may also be referred to as an index or the like. This is not limited in this application.

Optionally, the header terminal may send SCI by using a physical layer to notify a terminal in the terminal group of the common resource.

For example, the header terminal may send the first configuration information to a terminal by using group common SCI. One or more terminals in the terminal group may receive the first configuration information by using the group common SCI.

Optionally, the group common SCI may be scrambled by using a group identifier. The group identifier may be a group-radio network temporary identifier (G-RNTI). When a terminal that receives the SCI succeeds in descrambling and decoding the SCI by using the group identifier, the terminal determines that the first configuration information is the first configuration information of the group.

For example, the header terminal may send the first configuration information to a terminal by using terminal-level SCI. One or more terminals in the group may receive the first configuration information by using the SCI.

Optionally, the user-level SCI may be scrambled by using a terminal identifier. For example, the terminal identifier may be a radio network temporary identity (RNTI). When a terminal that receives the SCI succeeds in descrambling and decoding the SCI by using the terminal identifier, the terminal determines that the first configuration information is the first configuration information of the terminal.

Optionally, the RNTI may be a sidelink RNTI (s-RNTI), another sidelink identifier, or the like.

Step 205. The first terminal performs sidelink communication with a terminal in the terminal group on the sidelink resource configured by using the first configuration information.

For example, the first terminal may perform sidelink communication with a terminal in the terminal group on the sidelink resource configured by using the first configuration information, that is, the first terminal may send sidelink information to another terminal in the terminal group.

In an implementation, the first terminal may determine a currently available sidelink resource from the sidelink resource configured by using the first configuration information, to perform sidelink communication with a terminal in the terminal group.

Specifically, when the first terminal is a transmit-side terminal, and another terminal in the terminal group is a receive-side terminal, that is, when the first terminal sends the sidelink information to a terminal in the terminal group, the first terminal may determine a currently available sidelink sending resource from the sidelink resource configured by using the first configuration information, and perform sidelink communication with the terminal in the terminal group on the sidelink sending resource.

Optionally, the transmit-side terminal may send a sidelink signal to one or more receive-side terminals on the common resource, for example, at least one of a reference signal (including a demodulation reference signal (DMRS), a channel state information-reference signal (CSI-RS), a sounding reference signal (SRS), or the like), a physical sidelink shared channel (PSSCH), a physical sidelink control channel (PSCCH), a physical sidelink discovery channel (PSDCH), a physical sidelink broadcast channel (PSBCH), or a sidelink uplink control channel.

Optionally, the receive-side terminal may receive, on the common resource, a sidelink signal sent by one or more transmit-side terminals, for example, at least one of a reference signal (including a demodulation reference signal (DMRS), a channel state information-reference signal (CSI-RS), a sounding reference signal (SRS), or the like), a physical sidelink shared channel (PSSCH), a physical sidelink control channel (PSCCH), a physical sidelink discovery channel (PSDCH), a physical sidelink broadcast channel (PSBCH), or a sidelink uplink control channel.

Certainly, the receive-side terminal may receive the sidelink signal on another sidelink resource, and can receive the sidelink signal not only on the common resource. For example, the receive-side terminal may simultaneously receive a unicast sidelink signal, a multicast sidelink signal, and a broadcast sidelink signal. As long as the sidelink signal falls within a receiving capability range of the receive-side terminal, the receive-side terminal can receive the sidelink signal on a configured receiving resource.

Optionally, sidelink communication may be unicast communication and/or multicast communication, or the like.

Based on the solution, the first terminal performs sidelink communication with a terminal in the terminal group on the common resource of the N terminals in the terminal group, thereby implementing communication between different terminals in the terminal group. In addition, the header terminal notifies the terminal in the terminal group of the common resource by using the PC5 air interface, and does not need to notify the common resource by using an access network device. Therefore, a signaling delay caused by participation of the access network device can be avoided.

The solution is described below with reference to the accompanying drawings by using an example.

Figure 3:
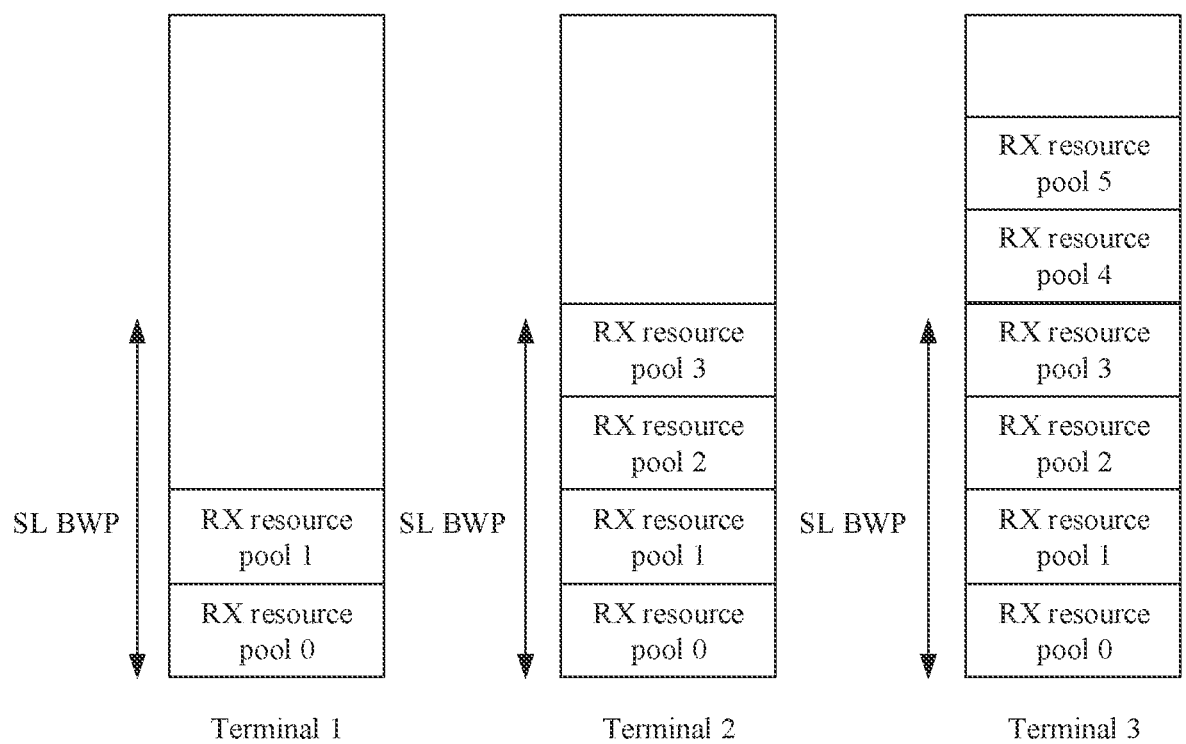
FIG. 3 is a schematic diagram of a terminal resource according to this application.

FIG. 3 is a schematic diagram of a terminal resource. The terminal group includes a terminal 1, a terminal 2, and a terminal 3. An example in which the common resource a receiving resource pool (RX Resource pool) is used for description. A resource configured by a network side for each terminal in the terminal group includes a receiving resource pool. Specifically, the resource configured for the terminal 1 includes resources corresponding to an RX resource pool 0 and an RX resource pool 1, the resource configured for the terminal 2 includes resources corresponding to the RX resource pool 0, the RX resource pool 1, an RX resource pool 2, and an RX resource pool 3, and the resource configured for the terminal 3 includes resources corresponding to the RX resource pool 0, the RX resource pool 1, the RX resource pool 2, the RX resource pool 3, an RX resource pool 4, and an RX resource pool 5.

How the network side configures the resource for the terminal is subsequently described in detail.

Based on the resource configuration shown in FIG. 3, assuming that the terminal 2 is the header terminal, the first terminal may be the terminal 1 or the terminal 3. For example, the first terminal is the terminal 1, the header terminal may configure a common resource for the terminal 1 by using the first configuration information in any of the following methods.

Method 1: The header terminal configures, for the terminal 1, a common resource of all terminals other than the terminal 1 in the terminal group by using the first configuration information.

As shown in FIG. 3, the terminals other than the terminal 1 in the terminal group include the terminal 2 and the terminal 3. Therefore, the common resources are a common resource of the terminal 2 and the terminal 3, that is, the resources corresponding to the RX resource pool 0, the RX resource pool 1, the RX resource pool 2, and the RX resource pool 3.

Therefore, the header terminal configures, for the terminal 1 by using the first configuration information, the resources corresponding to the RX resource pool 0, the RX resource pool 1, the RX resource pool 2, and the RX resource pool 3, so that the terminal 1 may send sidelink information, such as unicast information or multicast information, to the terminal 2 and/or the terminal 3 on these common resources; and the terminal 2 and/or the terminal 3 may receive the sidelink information, such as the unicast information or the multicast information, sent by the terminal 1 on these common resources. Alternatively, it is understood as follows: The resource corresponding to the RX resource pool 0, the RX resource pool 1, the RX resource pool 2, or the RX resource pool 3 is configured as a sending resource of the terminal 1, and the terminal 1 sends multicast information to the terminal 2 and/or the terminal 3 on these available sending resources. Therefore, the terminal 2 and/or the terminal 3 may receive sidelink information sent by the terminal 1 on these common resources.

For example, if the resource corresponding to the RX resource pool 0 is configured as the sending resource of the terminal 1, the terminal 1 may send the sidelink information to the terminal 2 and/or the terminal 3 in the RX resource pool 0. For another example, if the resource corresponding to the RX resource pool 1 is configured as the sending resource of the terminal 1, the terminal 1 may send the sidelink information to the terminal 2 and/or the terminal 3 on the resource corresponding to the RX resource pool 1. For another example, if the resources corresponding to the RX resource pool 0 and the RX resource pool 1 both are configured as sending resources of the terminal 1, the terminal 1 may send the sidelink information to the terminal 2 and/or the terminal 3 on the resource corresponding to the RX resource pool 0 and/or the resource corresponding to the RX resource pool 1. For another example, if the resources corresponding to the RX resource pool 2 and the RX resource pool 3 both are configured as sending resources of the terminal 1, the terminal 1 may send the sidelink information to the terminal 2 and/or the terminal 3 on the resource corresponding to the RX resource pool 2 and/or the resource corresponding to the RX resource pool 3.

Method 2: The header terminal configures, for the terminal 1, a common resource of all terminals in the terminal group by using the first configuration information.

As shown in FIG. 3, all the terminals in the terminal group include the terminal 1, the terminal 2, and the terminal 3. Therefore, the common resource is a common resource of the terminal 1, the terminal 2, and the terminal 3, that is, the resources corresponding to the RX resource pool 0 and the RX resource pool 1.

Therefore, the header terminal configures, for the terminal 1 by using the first configuration information, the resources corresponding to the RX resource pool 0 and the RX resource pool 1, so that the terminal 1 may send sidelink information to the terminal 2 and/or the terminal 3 on these common resources, and the terminal 2 and/or the terminal 3 may receive the sidelink information sent by the terminal 1 on these common resources. Alternatively, it is understood as follows: The resource corresponding to the RX resource pool 0 and/or the resource corresponding to the RX resource pool 1 each are configured as a sending resource of the terminal 1, and the terminal 1 sends sidelink information to the terminal 2 and/or the terminal 3 on these sending resources. Therefore, the terminal 2 and/or the terminal 3 may receive the sidelink information sent by the terminal 1 on these common resources.

For example, if the resource corresponding to the RX resource pool 0 is configured as the sending resource of the terminal 1, the terminal 1 may send the sidelink information to the terminal 2 and/or the terminal 3 on the resource corresponding to the RX resource pool 0. For another example, if the resource corresponding to the RX resource pool 1 is configured as the sending resource of the terminal 1, the terminal 1 may send the sidelink information to the terminal 2 and/or the terminal 3 on the resource corresponding to the RX resource pool 1. For another example, if the resources corresponding to the RX resource pool 0 and the RX resource pool 1 both are configured as sending resources of the terminal 1, the terminal 1 may send the sidelink information to the terminal 2 and/or the terminal 3 on the resource corresponding to the RX resource pool 0 and/or the resource corresponding to the RX resource pool 1.

In an implementation, step 203 may be specifically implemented by using the following method:

Step A: An access network device/network management system sends group information of the terminal group to the header terminal.

Step B: The header terminal determines the common resource based on the group information, that is, determines the common resource in the resource pools or the sidelink BWP resources of the N terminals in the terminal group.

The group information sent by the access network device/network management system to the header terminal includes at least one piece of the following information: a terminal identifier of a terminal in the terminal group, a terminal status of a terminal in the terminal group, a group identifier of the terminal group, or the common resource.

For example, the group information sent by the access network device/network management system to the header terminal includes the terminal identifier of the terminal in the terminal group and/or the terminal status of the terminal in the terminal group. In this case, the header terminal may determine the common resource based on the terminal identifier of the terminal in the terminal group and/or the terminal status of the terminal in the terminal group, and the sidelink resource of the terminal in the terminal group. The terminals in the terminal group may report their respective sidelink resources to the header terminal in advance, or the access network device/network management system sends the sidelink resource of each terminal in the terminal group to the header terminal in advance.

Optionally, the sidelink resource of the terminal may be referred to as a resource of the terminal for short. The resource of the terminal may be a configured sidelink resource, an activated sidelink resource, an available sidelink resource, or the like of the terminal. For another example, the group information sent by the access network device/network management system to the header terminal includes the common resource, and the header terminal may determine the common resource based on the group information.

In an implementation method, before step 203, step 201a and step 201b are further included; or before step 203, step 202a and step 202b are further included.

Step 201a. An access network device/network management system sends second configuration information to a first terminal.

For example, the second configuration information may be at least one of preconfiguration information, system information, RRC common information, or RRC dedicated information.

The first terminal determines a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

It may be understood as follows: The second configuration information is used to configure a resource for the first terminal. FIG. 3 is used as an example. If the first terminal is the terminal 1, the resource configured by using the second configuration information includes the RX resource pool 0 and the RX resource pool 1. For another example, if the first terminal is the terminal 2, the resource configured by using the second configuration information includes the RX resource pool 0, the RX resource pool 1, the RX resource pool 2, and the RX resource pool 3. For another example, if the first terminal is the terminal 3, the resource configured by using the second configuration information includes the RX resource pool 0, the RX resource pool 1, the RX resource pool 2, and the RX resource pool 3, the RX resource pool 4, and the RX resource pool 5.

Step 201b: The first terminal sends third configuration information to a header terminal, where the third configuration information is used by the header terminal to determine a resource pool and/or a sidelink BWP of the first terminal.

It should be noted that the third configuration information may be the second configuration information, or may be some information of the second configuration information, or may be other information.

It may be understood as follows: The first terminal notifies, by using the third configuration information, the header terminal of the resource configured for the first terminal by using the second configuration information.

Optionally, the first terminal may further send the third configuration information to a terminal other than the first terminal and the header terminal in the terminal group. It may be understood as follows: The first terminal notifies, by using the third configuration information, the terminal other than the first terminal and the header terminal in the terminal group of the resource configured for the first terminal by using the second configuration information.

Step 202a. A header terminal sends second configuration information to a first terminal.

The first terminal determines a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

It may be understood as follows: The second configuration information is used to configure a resource for the first terminal. FIG. 3 is used as an example. If the first terminal is the terminal 1, the resource configured by using the second configuration information includes the RX resource pool 0 and the RX resource pool 1. For another example, if the first terminal is the terminal 2, the resource configured by using the second configuration information includes the RX resource pool 0, the RX resource pool 1, the RX resource pool 2, and the RX resource pool 3. For another example, if the first terminal is the terminal 3, the resource configured by using the second configuration information includes the RX resource pool 0, the RX resource pool 1, the RX resource pool 2, and the RX resource pool 3, the RX resource pool 4, and the RX resource pool 5.

Step 201b: The first terminal sends fourth configuration information to an access network device/network management system, where the fourth configuration information is used by the access network device/network management system to determine a resource pool and/or a sidelink BWP of the first terminal.

It should be noted that the fourth configuration information may be the second configuration information, or may be some information of the second configuration information, or may be other information.

It may be understood as follows: The first terminal notifies, by using the fourth configuration information, the access network device/network management system of the resource configured for the first terminal by using the second configuration information.

Optionally, the first terminal may further send the fourth configuration information to a terminal other than the first terminal and the header terminal in the terminal group. It may be understood as follows: The first terminal notifies, by using the fourth configuration information, the terminal other than the first terminal and the header terminal in the terminal group of the resource configured for the first terminal by using the second configuration information.

Based on any one of the foregoing implementations, the first terminal may further send at least one piece of the following information to the header terminal in the terminal group and/or the terminal other than the first terminal and the header terminal in the terminal group:

a terminal identifier of the first terminal, a terminal status of the first terminal, a terminal capability of the first terminal, or radio frequency location information of the first terminal.

Optionally, the terminal identifier in this application may include at least one of a radio network temporary identifier, a layer 2 identifier, a sidelink target identifier, and a sidelink source identifier.

The radio network temporary identifier may be an identifier used to identify a terminal, and may have a value of 0 to 65535.

The layer 2 identifier may be an identifier used to identify a terminal at a higher layer, for example, may be a medium access control (MAC) layer identifier.

The sidelink target identifier may be an identifier of a receive-side terminal in sidelink communication, for example, an identifier corresponding to a terminal of a receiving target of a sidelink signal.

The sidelink source identifier may be an identifier of a transmit-side terminal in sidelink communication, for example, an identifier corresponding to a terminal of a sending source of a sidelink signal.

Optionally, the terminal status in this application may include at least one of in-coverage, out-of-coverage, a connected state, an idle state, or an inactive state.

In-coverage may mean in coverage of the access network device. Specifically, for example, in-coverage may be that power of a received signal may be greater than (greater than or equal to) a threshold, for example, −3 dB, where dB is a dimensionless unit, and represents an amplitude difference between two signals. For example, dB is a unit of a power gain and represents a relative value.

Optionally, a terminal in coverage may be a terminal that receives a system message of the access network device, or may be a terminal that receives an RRC message of the access network device. For example, the terminal may be a terminal in an idle state, a terminal in a connected state, or a terminal in an inactive state. The inactive state may also be referred to as a third state.

Specifically, the terminal in an idle state or an inactive state may be a terminal that receives the system message of the access network device. The terminal in a connected state may be a terminal having an RRC link to the access network device, and the terminal may receive the RRC message of the access network device.

Out-of-coverage may mean out of coverage of the access network device. Specifically, for example, out-of-coverage may be that power of a received signal may be less than (less than or equal to) a threshold, for example, −3 dB.

Optionally, a terminal out of coverage may be a terminal in an idle state, or may be a terminal in an inactive state.

Optionally, because the terminal out of coverage cannot receive a signal sent by the access network device or has relatively poor receiving performance, a sidelink resource of the terminal out of coverage may be a sidelink resource configured by using preconfiguration information. For example, a BWP of the terminal out of coverage is a preconfigured BWP, that is, a working BWP of the terminal out of coverage is the preconfigured BWP.

Optionally, a terminal in coverage and in an idle state or an inactive state cannot receive RRC dedicated signaling sent by the access network device. Therefore, a sidelink resource of the terminal in coverage and in an idle state or an inactive state may be a sidelink resource configured by using preconfiguration information and/or a sidelink resource configured by using system information. For example, a BWP of the terminal in coverage and in an idle state or an inactive state is a preconfigured BWP and/or a system common BWP, that is, a working BWP of the terminal out of coverage is the preconfigured BWP and/or the system common BWP.

Optionally, a terminal in coverage and in a connected state may receive the system information sent by the access network device, and may also receive the RRC dedicated signaling sent by the access network device. Therefore, a sidelink resource of the terminal in coverage and in a connected state may be a sidelink resource configured by using preconfiguration information and/or a sidelink resource configured by using the system information and/or a sidelink resource configured by using the RRC dedicated signaling. For example, a BWP of the terminal in coverage and in a connected state is a preconfigured BWP and/or a system common BWP and/or a dedicated BWP, that is, a working BWP of the terminal out of coverage is the preconfigured BWP and/or the system common BWP and/or the dedicated BWP.

Optionally, the access network device or the header terminal may determine a BWP of the first terminal based on the terminal status sent by the first terminal, and further determine an available sidelink resource of the first terminal.

Optionally, the terminal capability in this application may include a bandwidth capability and/or a radio frequency capability. The bandwidth capability may be at least one of a radio frequency bandwidth capability, a channel bandwidth capability, or a maximum channel bandwidth capability that can be supported by the terminal. The radio frequency capability may alternatively be a transmission radio frequency capability, and/or a receiving radio frequency capability, and/or a radio frequency capability (applicable to both transmission and receiving) of the terminal. The radio frequency capability may alternatively be a radio frequency bandwidth capability, and/or a radio frequency center point location, or the like.

Optionally, there is a correspondence between the bandwidth capability and a location and/or a resource of the BWP. For example, a resource bandwidth of the BWP may be equal to the bandwidth capability. For example when the bandwidth capability supported by the terminal is 20 M, the resource bandwidth of the BWP is 20 M. For example, the location of the BWP may be in a center of the carrier bandwidth, or a start RB location of the BWP is a lowest RB number of the carrier bandwidth, or the like.

Optionally, the correspondence between the bandwidth capability and the location and/or the resource of the BWP may be predefined in a protocol, or may be notified by the access network device/network management system to the terminal by using signaling, or may be learned in another manner. This is not specifically limited in this application.

Optionally, the access network device or the header terminal may determine a BWP of the first terminal based on the terminal capability sent by the first terminal, and further determine an available sidelink resource of the first terminal.

Figure 4:
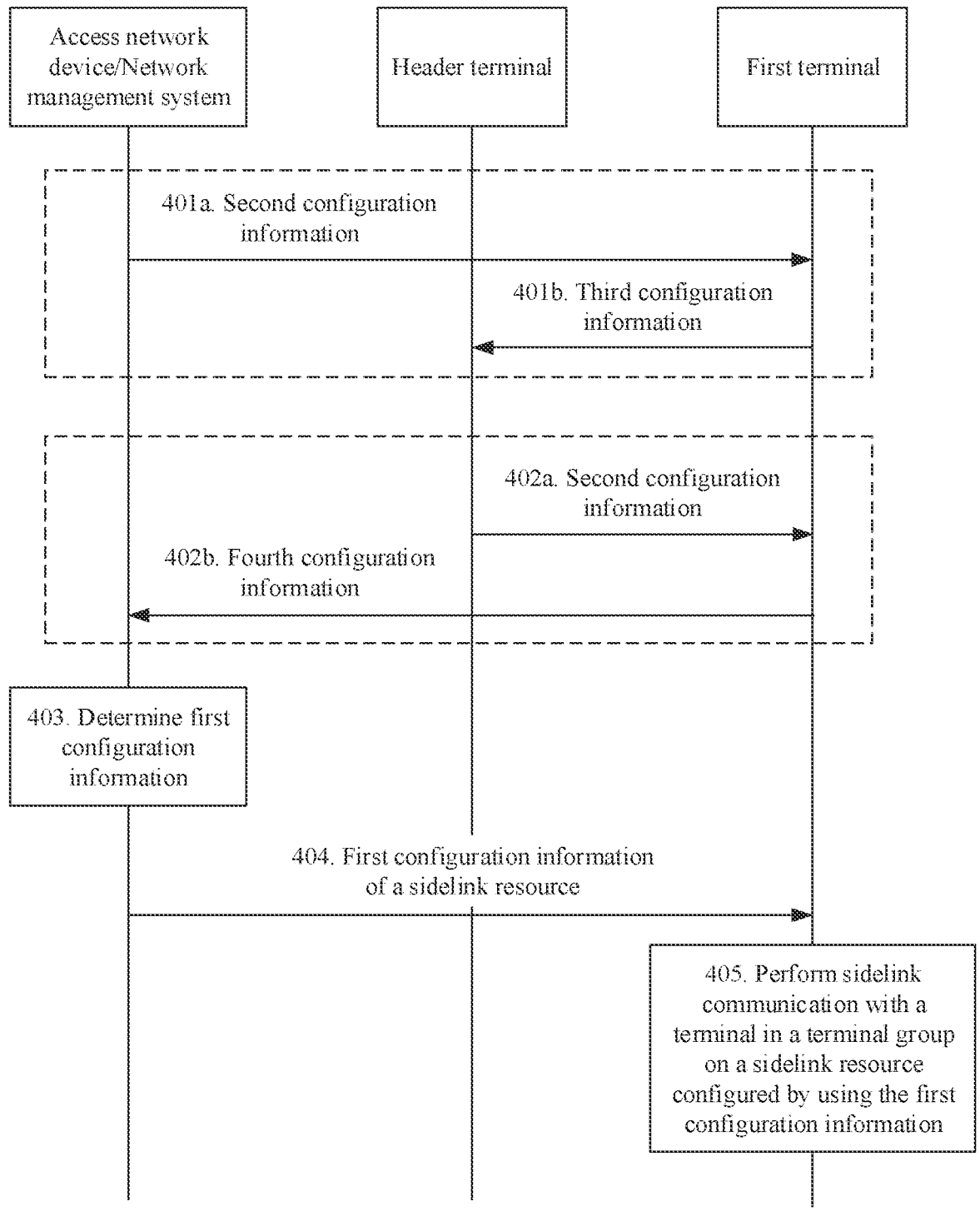
FIG. 4 is a flowchart of a sidelink resource configuration method according to this application.

Based on the network architecture shown in FIG. 1, this application provides another sidelink resource configuration method. As shown in FIG. 4, the method includes the following steps.

Step 403: An access network device/network management system determines first configuration information.

Step 404. The access network device/network management system sends the first configuration information of a sidelink resource to a first terminal, where the sidelink resource configured by using the first configuration information includes a common resource in resource pools or sidelink BWP resources of N terminals in a terminal group, the terminal group includes the first terminal, and N is a positive integer.

In an implementation, if the sidelink resource configured by using the first configuration information is the common resource in the resource pools of the N terminals in the terminal group, the common resource herein may be a common resource in frequency domain.

Optionally, the common resource may be a common receiving resource and/or a common sending resource.

Optionally, the N terminals may include the first terminal, or may not include the first terminal.

In an implementation, the N terminals herein are all terminals other than the first terminal in the terminal group. For example, the terminal group includes 20 terminals respectively numbered 1 to 20. If the first terminal is the terminal 1, the N terminals herein refer to the terminal 2 to the terminal 20. The terminal 1 to the terminal 20 may include a header terminal. Based on the implementation, the header terminal sends a common resource in resource pools or sidelink BWP resources of the 19 terminals to the terminal 1, that is, the common resource herein is a resource included in all the 19 terminals.

In another implementation, the N terminals herein are all terminals in the terminal group. For example, the terminal group includes 20 terminals respectively numbered 1 to 20. If the first terminal is the terminal 1, the N terminals herein refer to the terminal 1 to the terminal 20. The terminal 1 to the terminal 20 may include a header terminal. Based on the implementation, the header terminal sends a common resource in resource pools or sidelink BWP resources of the 20 terminals to the terminal 1, that is, the common resource herein is a resource included in all the 20 terminals.

Optionally, the access network device/network management system may send the first configuration information to the first terminal by using at least one of system information, RRC common information, or RRC dedicated information. For example, the access network device/network management system may indicate, by using the first configuration information, an identifier of a resource pool included in the common resource, for example, a resource pool 0 or a resource pool 1. For another example, the access network device/network management system may indicate a location (for example, a start location+bandwidth) of a BWP in the common resource by using the first configuration information.

Optionally, a specific indication method of the first configuration information in FIG. 3 may be similar to the method in FIG. 2(c). Details are not specifically described herein again.

Step 405. The first terminal performs sidelink communication with a terminal in the terminal group on the sidelink resource configured by using the first configuration information.

For example, the first terminal may perform sidelink communication with a terminal in the terminal group on the sidelink resource configured by using the first configuration information, that is, the first terminal may send sidelink information to the terminal in the terminal group.

In an implementation, the first terminal may determine a currently available sidelink resource from the sidelink resource configured by using the first configuration information, to perform sidelink communication with a terminal in the terminal group.

Specifically, when the first terminal is a transmit-side terminal, and another terminal in the terminal group is a receive-side terminal, that is, when the first terminal sends the sidelink information to a terminal in the terminal group, the first terminal may determine a currently available sidelink sending resource from the sidelink resource configured by using the first configuration information, and perform sidelink communication with the terminal in the terminal group on the sidelink sending resource.

Optionally, sidelink communication may be unicast communication and/or multicast communication, or the like.

Based on the solution, the first terminal performs sidelink communication with a terminal in the terminal group on the common resource of the N terminals in the terminal group, thereby implementing communication between different terminals in the terminal group. In addition, the access network device/network management system notifies the terminal in the terminal group of the common resource, and a requirement in a base station scheduling mode may be better met. Therefore, the access network device may properly coordinate resources, thereby fully using the resource and improving transmission performance.

For a specific example of the embodiment shown in FIG. 4, refer to the example described in the embodiment shown in FIG. 4 with reference to FIG. 3. Details are not described herein again. A difference from the foregoing example lies in that the access network device/network management system sends the first configuration information to the terminal in the terminal group.

In an implementation, step 403 may be specifically implemented by using the following method:

Step A: A header terminal sends group information of the terminal group to the access network device/network management system.

Step B: The access network device/network management system determines the common resource based on the group information, that is, determines the common resource in the resource pools or the sidelink BWP resources of the N terminals in the terminal group.

The group information sent by the header terminal to the access network device/network management system includes at least one piece of the following information: a terminal identifier of a terminal in the terminal group, a terminal status of a terminal in the terminal group, a group identifier of the terminal group, or the common resource.

For example, the group information sent by the header terminal to the access network device/network management system includes the terminal identifier of the terminal in the terminal group and/or the terminal status of the terminal in the terminal group. In this case, the access network device/network management system may determine the common resource based on the terminal identifier of the terminal in the terminal group and/or the terminal status of the terminal in the terminal group, and the sidelink resource of the terminal in the terminal group. The terminals in the terminal group may report their respective sidelink resources to the access network device/network management system in advance, or the header terminal sends the sidelink resource of each terminal in the terminal group to the access network device/network management system in advance, or the common resource is configured by the access network device/network management system.

Optionally, the sidelink resource of the terminal may be referred to as a resource of the terminal for short. The resource of the terminal may be a configured sidelink resource, an activated sidelink resource, an available sidelink resource, or the like of the terminal.

For another example, the group information sent by the header terminal to the access network device/network management system includes the common resource, and the access network device/network management system may determine the common resource based on the group information.

In an implementation method, before step 403, step 401a and step 401b are further included; or before step 403, step 402a and step 402b are further included.

A specific implementation process of step 401a and step 401b is the same as an implementation process of step 201a and step 201b in the embodiment shown in FIG. 2(c), and reference may be made to the foregoing description.

A specific implementation process of step 402a and step 402b is the same as an implementation process of step 202a and step 202b in the embodiment shown in FIG. 2(c), and reference may be made to the foregoing description.

Based on any one of the foregoing implementations, the first terminal may further send at least one piece of the following information to the header terminal in the terminal group and/or a terminal other than the first terminal and the header terminal in the terminal group:

a terminal identifier of the first terminal, a terminal status of the first terminal, a terminal capability of the first terminal, or radio frequency location information of the first terminal.

Based on the network architecture shown in FIG. 1, this application provides another sidelink resource configuration method. The method may be used for unicast communication between two terminals.

The method includes the following: A first terminal receives first configuration information of a sidelink resource, where the sidelink resource configured by using the first configuration information includes a resource pool or a sidelink BWP resource of a third terminal. The first terminal performs sidelink communication with the third terminal on the sidelink resource configured by using the first configuration information. The third terminal is a terminal, other than the first terminal, that can communicate with the first terminal.

Optionally, the resource pool of the third terminal may be a receiving resource pool and/or a sending resource pool.

In an implementation, the first terminal may determine a currently available sidelink resource from the sidelink resource configured by using the first configuration information, to perform sidelink communication with the third terminal.

Specifically, when the first terminal is a transmit-side terminal, and the third terminal is a receive-side terminal, that is, when the first terminal sends sidelink information to the third terminal, the first terminal may determine a currently available sidelink sending resource from the sidelink resource configured by using the first configuration information, and perform sidelink communication with the third terminal on the sidelink sending resource.

Based on this embodiment, sidelink communication between two terminals may be implemented. It should be noted that this embodiment may be used for communication between two terminals in a terminal group, or may be used for communication between two terminals that do not belong to a same terminal group.

In this embodiment, the first terminal may receive the first configuration information from an access network device/network management system; or the first terminal may receive the first configuration information from a header terminal; or the first terminal may receive the first configuration information from the third terminal.

Optionally, the first terminal may further receive second configuration information from the access network device/network management system/header terminal. The second configuration is used by the first terminal to determine a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

Based on the network architecture shown in FIG. 1, this application provides another sidelink communication method. The method may be used for multicast communication in a terminal group.

The sidelink communication method may include a process of joining a group and/or a process of exiting a group.

Optionally, the process of joining a group may be that a terminal sends, to an access network device and/or a header terminal, information for applying for joining the group. The information may include at least one of a terminal identifier, a terminal status, a terminal capability, a radio frequency location, sidelink configuration information of the terminal, third configuration information, or fourth configuration information. For example, the information includes at least one of the following: an available sidelink resource of the terminal, a transmission radio frequency capability of the terminal, a receiving radio frequency capability of the terminal, a radio frequency capability (applicable to both transmission and receiving) of the terminal, and a bandwidth capability of the terminal.

Optionally, after receiving the information that is of the terminal and that is for applying for joining the group, the access network device and/or the header terminal may feed back, to the terminal, information indicating whether the terminal successfully joins the group. A group identifier and/or first configuration information may be added to the feedback information. After receiving the feedback information, the first terminal may determine that the application for joining the group succeeds, and perform sidelink communication with another terminal in the group on an available resource of the group.

Optionally, the process of exiting a group may be that a terminal sends, to an access network device and/or a header terminal, information for applying for exiting the group. After receiving the information that is of the terminal and that is for applying for exiting the group, the access network device and/or the header terminal may feed back, to the terminal, information indicating whether the terminal successfully exits the group.

Optionally, the second configuration information in this application is sent by the access network device and/or the second terminal to the first terminal, and is used by the first terminal to determine the resource pool and/or the sidelink BWP of the first terminal. The third configuration information is sent by the first terminal to the second terminal, and is used by the second terminal to determine the resource pool and/or the sidelink BWP of the first terminal. The fourth configuration information is sent by the first terminal to the access network device, and is used by the access network device to determine the resource pool and/or the sidelink BWP of the first terminal.

Optionally, parameters included in the first configuration information, the second configuration information, the third configuration information, and the fourth configuration information may be the same or may be different. For example, at least one of the following parameters may be included: a subcarrier spacing, a CP type, a start location of a BWP, a bandwidth of a BWP, a waveform, uplink and downlink configuration of a frame structure, a resource pool index, a start location of a resource pool, or a bandwidth of a resource pool.

Optionally, the solution in this application is applicable to a base station scheduling mode, or is applicable to a terminal autonomous selection mode, or is applicable to another sidelink scheduling or resource determining mode. This is not specifically limited in this application.

For example, in the base station scheduling mode, the access network device may indicate, in DCI, a resource that is in the common resource and that is used by a transmit-side terminal to perform sidelink communication.

Specifically, the terminal determines the common resource in the foregoing manner, and the access network device may determine an available sidelink resource of the terminal based on the common resource. Further, the access network device may indicate, in the DCI, a resource pool in which the resource is located when the transmit-side terminal performs sidelink transmission, and a resource for performing sidelink transmission in the resource pool; or may indicate, in the DCI, a resource for performing sidelink transmission in the resource pool, that is, a resource pool in which the resource is located w % ben the transmit-side terminal performs sidelink transmission does not need to be indicated. The terminal may transmit a sidelink signal based on an indication of the DCI.

For example, in the terminal autonomous selection mode, the transmit-side terminal may perceive a resource in the common resource, and then determine a resource used for sidelink communication.

Specifically, in the foregoing manner, the terminal determines the common resource, and determines a sidelink sending resource from the common resource. Specifically, the common resource may include one or more resource pools. The terminal may perceive, in a determined resource pool, whether another terminal occupies a resource in the resource pool. If no terminal occupies the resource, the transmit-side terminal may transmit a sidelink signal on the resource.

Optionally, any one of the foregoing embodiments in this application may be used as an independent embodiment, or the embodiments may be combined with each other. Specifically, this is not limited in this application.

It may be understood that, to implement the foregoing functions, each network element includes a corresponding hardware structure and/or software module for implementing each function. Persons of ordinary skill in the art should easily be aware that, in combination with the example units and algorithm steps described in the embodiments disclosed in this specification, the present invention can be implemented by hardware or a combination of hardware and computer software. Whether a function is performed by hardware or hardware driven by computer software depends on a particular application and a design constraint of the technical solutions. Persons skilled in the art may use different methods to implement the described functions for each particular application, but it should not be considered that such implementation goes beyond the scope of the present invention.

Figure 5:
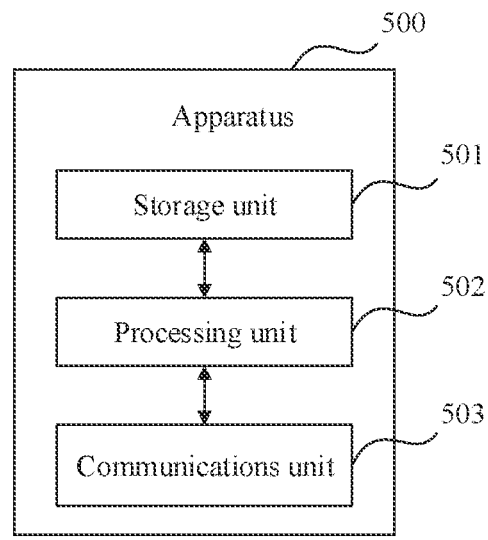
FIG. 5 is a schematic diagram of an apparatus according to this application.

FIG. 5 is a possible example block diagram of an apparatus in this application, and the apparatus 500 may exist in a form of software or hardware. The apparatus 500 may include a processing unit 502 and a communications unit 503. In an implementation, the communications unit 503 may include a receiving unit and a sending unit. The processing unit 502 is configured to control and manage an action of the apparatus 500. The communications unit 503 is configured to support communication between the apparatus 500 and another network entity. The apparatus 500 may further include a storage unit 501, configured to store program code and data of the apparatus 500.

The processing unit 502 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various examples of logical blocks, modules, and circuits described with reference to content disclosed in the present invention. The processor may alternatively be a combination of processors implementing a computing function, for example, a combination of one or more microprocessors, or a combination of the DSP and a microprocessor. The communications unit 503 may be a communications interface, a transceiver, a transceiver circuit, or the like, where the communications interface is a general name, and may include a plurality of interfaces during specific implementation. The storage unit 501 may be a memory.

In a first application, the apparatus 500 may be a terminal (that is, the first terminal) in any one of the foregoing embodiments, or may be a chip that can be used for the terminal. For example, when the apparatus 500 is a terminal, the processing unit may be a processor, and the communications unit may be a transceiver. Optionally, the transceiver may include a radio frequency circuit, and the storage unit may be, for example, a memory. For example, when the apparatus 500 is the chip that can be used for the terminal, the processing unit may be, for example, a processor, and the communications unit may be, for example, an input/output interface, a pin, or a circuit. The processing unit may execute computer-executable instructions stored in the storage unit. Optionally, the storage unit is a storage unit inside the chip, such as a register or a buffer. Alternatively, the storage unit may be a storage unit that is inside the terminal and that is located outside the chip, such as a read-only memory (ROM) or another type of static storage device that can store static information and instructions, or a random access memory (RAM).

In a first embodiment, the communications unit receives first configuration information of a sidelink resource, where the sidelink resource configured by using the first configuration information includes a common resource in resource pools or sidelink bandwidth part BWP resources of N terminals in a terminal group, the terminal group includes the first terminal, and N is a positive integer; and performs sidelink communication with a terminal in the terminal group on the sidelink resource configured by using the first configuration information.

In a possible implementation method, the N terminals are all terminals other than the first terminal in the terminal group, or the N terminals are all terminals in the terminal group.

In a possible implementation method, if the sidelink resource configured by using the first configuration information is a common resource in resource pools of N terminals in a terminal group, the common resource is a common resource in frequency domain.

In a possible implementation method, the communications unit is configured to receive second configuration information of the sidelink resource, and the first terminal determines a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

In a possible implementation method, the communications unit is configured to receive the second configuration information from an access network device.

In a possible implementation method, the communications unit is configured to send third configuration information to a head terminal in the terminal group and/or a terminal other than the first terminal and the head terminal in the terminal group. The third configuration information is used by the head terminal and/or the terminal other than the first terminal and the head terminal in the terminal group to determine the resource pool and/or the sidelink BWP of the first terminal.

In a possible implementation method, the communications unit is configured to receive the second configuration information from the head terminal in the terminal group.

In a possible implementation method, the communications unit is configured to send fourth configuration information to an access network device and/or a terminal other than the first terminal and the head terminal in the terminal group. The fourth configuration information is used by the access network device and/or the terminal other than the first terminal in the terminal group to determine the resource pool and/or the sidelink BWP of the first terminal.

In a possible implementation method, the communications unit is configured to send at least one piece of the following information to the head terminal in the terminal group and/or the terminal other than the first terminal and the head terminal in the terminal group: an identifier of the first terminal, a status of the first terminal, a capability of the first terminal, or radio frequency location information of the first terminal. The identifier of the first terminal includes at least one of a radio network temporary identifier, a layer 2 identifier, or a sidelink target identifier. The status of the first terminal includes at least one of in-coverage, out-of-coverage, a connected state, an idle state, or an inactive state. The capability of the first terminal includes at least one of a radio frequency bandwidth capability or a channel bandwidth capability.

In a possible implementation method, the head terminal is a terminal in the terminal group that is configured to manage the terminal group and/or assist in scheduling a terminal in the terminal group to perform sidelink communication.

In a second embodiment, the communications unit is configured to: receive first configuration information of a sidelink resource, where the sidelink resource configured by using the first configuration information includes a resource pool or a sidelink bandwidth part BWP resource of a third terminal; and perform sidelink communication with the third terminal on the sidelink resource configured by using the first configuration information.

In a possible implementation method, if the sidelink resource configured by using the first configuration information is a common resource in resource pools of N terminals in a terminal group, the common resource is a common resource in frequency domain.

In a possible implementation method, the communications unit is configured to receive second configuration information of the sidelink resource, and the first terminal determines a resource pool and/or a sidelink BWP resource of the first terminal based on the second configuration information. The resource pool includes a sending resource pool and/or a receiving resource pool, and the sidelink BWP resource includes a sidelink sending resource and/or a sidelink receiving resource.

In a second application, the apparatus 500 may be the first device (for example, the head terminal, or the access network device/network management system) in any one of the foregoing embodiments, or may be a chip that can be used for the first device. For example, when the apparatus 500 is the first device, the processing unit may be a processor, and the communications unit may be a transceiver. Optionally, the transceiver may include a radio frequency circuit, and the storage unit may be, for example, a memory. For example, when the apparatus 500 is the chip that can be used for the first device, the processing unit may be, for example, a processor, and the communications unit may be, for example, an input/output interface, a pin, or a circuit. The processing unit may execute computer-executable instructions stored in the storage unit. Optionally, the storage unit is a storage unit inside the chip, such as a register or a buffer. Alternatively, the storage unit may be a storage unit that is inside the first device and that is located outside the chip, such as a ROM, another type of static storage device that can store static information and instructions, or a RAM.

In an embodiment, the processing unit is configured to determine first configuration information of a sidelink resource, where the sidelink resource configured by using the first configuration information includes a common resource in resource pools or sidelink bandwidth part BWP resources of N terminals in a terminal group, the terminal group includes the first terminal, and N is a positive integer. The communications unit is configured to send the first configuration information of the sidelink resource to the first terminal, where the sidelink resource configured by using the first configuration information is used by the first terminal to perform sidelink communication with a terminal in the terminal group.

In a possible implementation method, the N terminals are all terminals other than the first terminal in the terminal group, or the N terminals are all terminals in the terminal group.

In a possible implementation method, if the sidelink resource configured by using the first configuration information is a common resource in resource pools of N terminals in a terminal group, the common resource is a common resource in frequency domain.

In a possible implementation method, the communications unit is configured to receive group information of the terminal group from a second device, and the processing unit is configured to determine the common resource based on the group information.

In a possible implementation method, the group information includes at least one piece of the following information: a terminal identifier of a terminal in the terminal group, a terminal status of a terminal in the terminal group, a group identifier of the terminal group, or the common resource.

In a possible implementation method, the first device is a head terminal, and the second device is an access network device; or the first device is an access network device, the second device is a head terminal, and the terminal group includes the head terminal.

In a third application, the apparatus 500 may be the second device (for example, the head terminal, or the access network device/network management system) in any one of the foregoing embodiments, or may be a chip that can be used for the second device. For example, when the apparatus 500 is the second device, the processing unit may be a processor, and the communications unit may be a transceiver. Optionally, the transceiver may include a radio frequency circuit, and the storage unit may be, for example, a memory. For example, when the apparatus 500 is the chip that can be used for the second device, the processing unit may be, for example, a processor, and the communications unit may be, for example, an input/output interface, a pin, or a circuit. The processing unit may execute computer-executable instructions stored in the storage unit. Optionally, the storage unit is a storage unit inside the chip, such as a register or a buffer. Alternatively, the storage unit may be a storage unit that is inside the second device and that is located outside the chip, such as a ROM, another type of static storage device that can store static information and instructions, or a RAM.

In an embodiment, the communications unit is configured to send group information of a terminal group to a first device. The group information is used by the first device to determine a common resource in resource pools or sidelink bandwidth part BWP resources of N terminals in the terminal group, and N is a positive integer.

In a possible implementation method, the N terminals are all terminals in the terminal group or all terminals other than the first terminal in the terminal group, and the common resource is sent by the first device to the first terminal.

In a possible implementation method, if the sidelink resource configured by using the first configuration information is a common resource in resource pools of N terminals in a terminal group, the common resource is a common resource in frequency domain.

In a possible implementation method, the group information includes at least one piece of the following information: a terminal identifier of a terminal in the terminal group, a terminal status of a terminal in the terminal group, a group identifier of the terminal group, or the common resource.

In a possible implementation method, the first device is a head terminal, the second device is an access network device, and the terminal group includes the head terminal; or the first device is an access network device, the second device is a head terminal, and the terminal group includes the head terminal.

It should be noted that, for a specific implementation process and a corresponding beneficial effect when the apparatus is used in the foregoing sidelink resource configuration method, refer to related descriptions in the foregoing method embodiments. Details are not described herein again.

Figure 6:
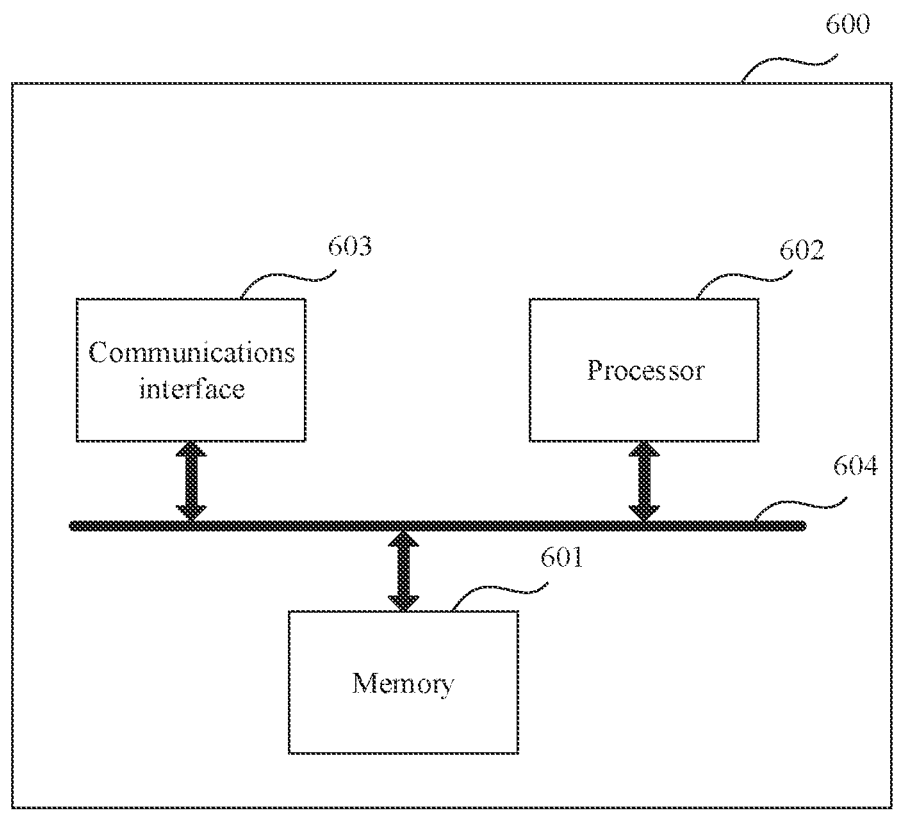
FIG. 6 is a schematic diagram of another apparatus according to this application.

FIG. 6 is a schematic diagram of an apparatus according to this application. The apparatus may be the head terminal, the first terminal, and the access network device/network management system. The apparatus 600 includes a processor 602, a communications interface 603, and a memory 601. Optionally, the apparatus 600 may further include a communication line 604. The communications interface 603, the processor 602, and the memory 601 may be connected to each other through the communication line 604. The communication line 604 may be a peripheral component interconnect (PCI) bus, an extended industry standard architecture (EISA) bus, or the like. The communication line 604 may be classified into an address bus, a data bus, a control bus, and the like. For ease of representation, only one thick line is used to represent the bus in FIG. 6, but this does not mean that there is only one bus or only one type of bus.

The processor 602 may be a CPU, a microprocessor, an ASIC, or one or more integrated circuits configured to control program execution in the solutions of this application.

The communications interface 603 uses any apparatus like a transceiver, and is configured to communicate with another device or a communications network, for example, an Ethernet, a radio access network (RAN), a wireless local area network (WLAN), a wired access network, or the like.

The memory 601 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 601 is not limited thereto. The memory may exist independently, and is connected to a processor through the communication line 604. Alternatively, the memory may be integrated into the processor.

The memory 601 is configured to store computer-executable instructions for executing the solutions in this application, and the processor 602 controls the execution. The processor 602 is configured to execute the computer-executable instructions stored in the memory 601, to implement the sidelink resource configuration methods provided in the following embodiments of this application.

Optionally, the computer-executable instructions in this embodiment of this application may also be referred to as application program code. This is not specifically limited in this embodiment of this application.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be disposed in an ASIC, and the ASIC may be disposed in a terminal. Optionally, the processor and the storage medium may alternatively be disposed in different components of a terminal.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specified function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A sidelink resource configuration method, comprising:
receiving, by a first terminal, second configuration information of a sidelink resource;
determining, by the first terminal, at least one of a resource pool or a sidelink bandwidth part (BWP) resource of the first terminal based on the second configuration information, wherein the resource pool comprises at least one of a sending resource pool or a receiving resource pool, and wherein the sidelink BWP resource comprises at least one of a sidelink sending resource or a sidelink receiving resource;
receiving, by the first terminal, first configuration information of the sidelink resource, wherein the sidelink resource configured by using the first configuration information comprises a common resource in resource pools or BWP resources of N terminals in a terminal group, the terminal group comprises the first terminal, and N is a positive integer; and
performing, by the first terminal, sidelink communication with a terminal in the terminal group on the sidelink resource.

2. The method according to claim 1, wherein the receiving, by the first terminal, second configuration information of the sidelink resource comprises:
receiving, by the first terminal, the second configuration information from an access network device.

3. The method according to claim 1, wherein the method further comprises:
sending, by the first terminal, third configuration information to a second terminal in the terminal group, wherein the third configuration information is used by the second terminal to determine the at least one of the resource pool or the sidelink BWP resource of the first terminal.

4. The method according to claim 1, wherein the receiving, by the first terminal, second configuration information of the sidelink resource comprises:
receiving, by the first terminal, the second configuration information from a second terminal in the terminal group.

5. The method according to claim 1, wherein the receiving, by the first terminal, second configuration information of the sidelink resource comprises:
sending, by the first terminal, fourth configuration information to an access network device, wherein the fourth configuration information is used by the access network device to determine the at least one of the resource pool or the sidelink BWP resource of the first terminal.

6. A sidelink resource configuration method, comprising:
sending, by a first device, second configuration information of a sidelink resource to a first terminal, wherein the second configuration information is used by the first terminal to determine at least one of a resource pool or a sidelink bandwidth part (BWP) resource of the first terminal, wherein the resource pool comprises at least one of a sending resource pool or a receiving resource pool, and wherein the sidelink BWP resource comprises at least one of a sidelink sending resource or a sidelink receiving resource; and
sending, by the first device, first configuration information of the sidelink resource to the first terminal, wherein the sidelink resource configured by using the first configuration information comprises a common resource in resource pools or BWP resources of N terminals in a terminal group, the terminal group comprises the first terminal, N is a positive integer, and the sidelink resource is used by the first terminal to perform sidelink communication with a terminal in the terminal group.

7. The method according to claim 6, wherein the method further comprises:
receiving, by the first device, group information of the terminal group from a second device; and
determining, by the first device, the common resource based on the group information, wherein:
the first device is a second terminal in the terminal group and the second device is an access network device; or
the first device is an access network device and the second device is a second terminal in the terminal group.

8. An apparatus, comprising:
a receiver;
at least one processor; and
one or more memories coupled to the at least one processor and storing programming instructions for execution by the at least one processor to:
receive second configuration information of a sidelink resource;
determine at least one of a resource pool or a sidelink bandwidth part (BWP) resource of the apparatus based on the second configuration information, wherein the resource pool comprises at least one of a sending resource pool or a receiving resource pool, and wherein the sidelink BWP resource comprises at least one of a sidelink sending resource or a sidelink receiving resource;
receive, by the receiver, first configuration information of the sidelink resource, wherein the sidelink resource configured by using the first configuration information comprises a common resource in resource pools or BWP resources of N terminals in a terminal group, the terminal group comprises the apparatus, and N is a positive integer; and perform sidelink communication with a terminal in the terminal group on the sidelink resource.

9. The apparatus according to claim 8, wherein the programming instructions are for execution by the at least one processor to receive the second configuration information from an access network device.

10. The apparatus according to claim 8, wherein the programming instructions are for execution by the at least one processor to send third configuration information to a second terminal in the terminal group, wherein the third configuration information is used by the second terminal to determine the at least one of the resource pool or the sidelink BWP of a first terminal.

11. The apparatus according to claim 8, wherein the programming instructions are for execution by the at least one processor to receive the second configuration information from a second terminal in the terminal group.

12. The apparatus according to claim 8, wherein the programming instructions are for execution by the at least one processor to send fourth configuration information to an access network device, wherein the fourth configuration information is used by the access network device to determine the at least one of the resource pool or the sidelink BWP of a first terminal.

13. An apparatus, comprising:
a transmitter;
at least one processor; and
one or more memories coupled to the at least one processor and storing programming instructions for execution by the at least one processor to:

send second configuration information of a sidelink resource to a first terminal, wherein the second configuration information is used by the first terminal to determine at least one of a resource pool or a sidelink bandwidth part (BWP) resource of the first terminal, wherein the resource pool comprises at least one of a sending resource pool or a receiving resource pool, and wherein the sidelink BWP resource comprises at least one of a sidelink sending resource or a sidelink receiving resource; and send, by the transmitter, first configuration information of the sidelink resource to the first terminal, wherein the sidelink resource configured by using the first configuration information comprises a common resource in resource pools or BWP resources of N terminals in a terminal group, the terminal group comprises the first terminal, N is a positive integer, and the sidelink resource is used by the first terminal to perform sidelink communication with a terminal in the terminal group.

14. The apparatus according to claim 13, wherein the programming instructions are for execution by the at least one processor to:

receive group information of the terminal group from a second device; and determine the common resource based on the group information, wherein:

the apparatus is a second terminal in the terminal group and the second device is an access network device; or the apparatus is an access network device and the second device is a second terminal in the terminal group.

* * * * *